United States Patent
Darmann et al.

(10) Patent No.: US 9,755,426 B2
(45) Date of Patent: Sep. 5, 2017

(54) FAULT CURRENT LIMITER

(71) Applicant: ASG Superconductors, S.p.A., Genoa (IT)

(72) Inventors: Francis Anthony Darmann, New South Wales (AU); Eoin Patrick Hodge, New South Wales (AU)

(73) Assignee: ASG Superconductors, S.p.A, Genoa (IT)

(*) Notice: Subject to any disclaimer, the term of this patent is extended or adjusted under 35 U.S.C. 154(b) by 498 days.

(21) Appl. No.: 14/363,635

(22) PCT Filed: Dec. 7, 2012

(86) PCT No.: PCT/AU2012/001498
§ 371 (c)(1),
(2) Date: Jun. 6, 2014

(87) PCT Pub. No.: WO2013/082668
PCT Pub. Date: Jun. 13, 2013

(65) Prior Publication Data
US 2014/0301007 A1   Oct. 9, 2014

(30) Foreign Application Priority Data
Dec. 9, 2011   (AU) .................. 2011905130

(51) Int. Cl.
  *H02H 9/00*   (2006.01)
  *H02H 9/02*   (2006.01)
  *H01F 29/14*   (2006.01)
(52) U.S. Cl.
  CPC ............. *H02H 9/021* (2013.01); *H01F 29/14* (2013.01); *H01F 29/146* (2013.01)
(58) Field of Classification Search
  USPC ........................................................ 361/58
  See application file for complete search history.

(56) References Cited

U.S. PATENT DOCUMENTS 4,117,524 A * 9/1978 Parton .................. G05F 3/06
                                                    323/331
2006/0158803 A1* 7/2006 Friedman ............... H02H 9/021
                                                    361/58
(Continued)

FOREIGN PATENT DOCUMENTS

IL   GB 2493772 A * 2/2013 ............ H01F 29/14
WO   WO 2011/024179 A2   3/2011

OTHER PUBLICATIONS

Cvoric et. al., "New Saturable-Core Fault Current Limiter Topology with Reduced Core Size", IEEE 6$^{th}$ International Power Electronics and Motion Control Conference, IPEMC '09, pp. 920-926, 2009.
(Continued)

*Primary Examiner* — Ronald W Leja
(74) *Attorney, Agent, or Firm* — Robert Babayi; Vector IP Law Group

(57) ABSTRACT

Described herein are fault current limiters including an input terminal for electrically connecting to a power source that provides a load current, and an output terminal for electrically connecting with a load circuit that draws the load current. The fault current limiters include a magnetically saturable core including at least one coil receiving limb disposed intermediate at least two return limbs, wherein the limbs longitudinally extend between at least two yokes, and wherein the at least two yokes and the at least two return limbs define at least a portion of one or more magnetic flux return paths for the at least one coil receiving limb. The fault current limiters further includes at least one AC coil disposed about the at least one coil receiving limb for carrying the load current between the input terminal and the output terminal. The fault current limiters also includes a magnetic biasing system for magnetically biasing the core such that, in response to one or more characteristics of the load current,
(Continued)

the at least one AC coil moves from a low impedance state to a high impedance state.

16 Claims, 41 Drawing Sheets

(56) References Cited

U.S. PATENT DOCUMENTS

| | | | | |
|---|---|---|---|---|
| 2007/0115598 A1* | 5/2007 | Darmann | ............... | H02H 9/023 |
| | | | | 361/19 |
| 2010/0046125 A1* | 2/2010 | Husband | ............... | H02H 9/021 |
| | | | | 361/19 |
| 2010/0309590 A1* | 12/2010 | Darmann | ................. | H01F 6/00 |
| | | | | 361/19 |
| 2012/0040839 A1* | 2/2012 | Darmann | ................. | H01F 6/06 |
| | | | | 505/211 |
| 2012/0153927 A1* | 6/2012 | Wolfus | ..................... | H01F 3/10 |
| | | | | 323/310 |
| 2014/0301007 A1* | 10/2014 | Darmann | ............... | H01F 29/14 |
| | | | | 361/93.1 |

OTHER PUBLICATIONS

International Search Report issued in PCT/AU2012/001498 dated Mar. 7, 2013.

* cited by examiner

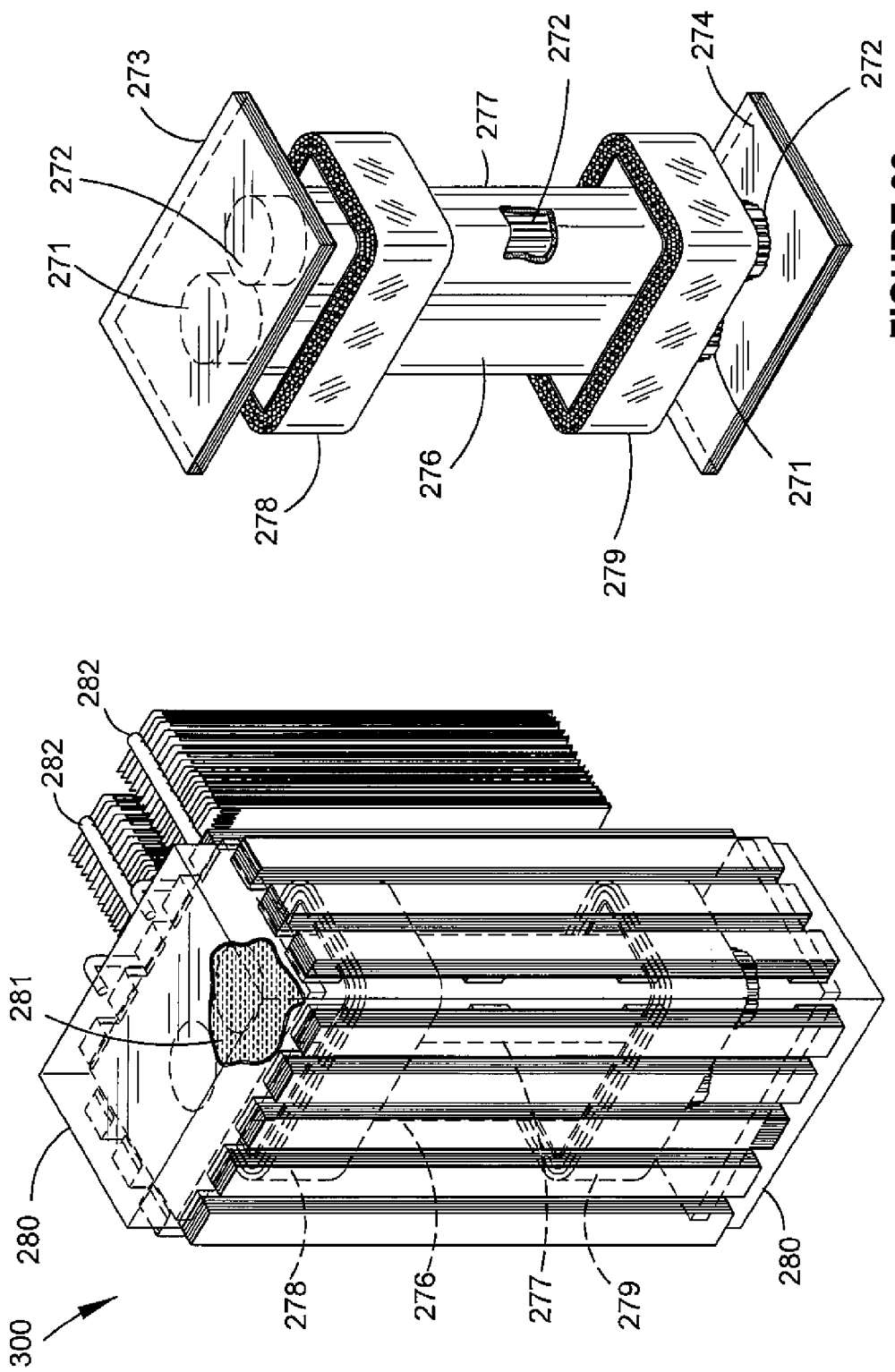

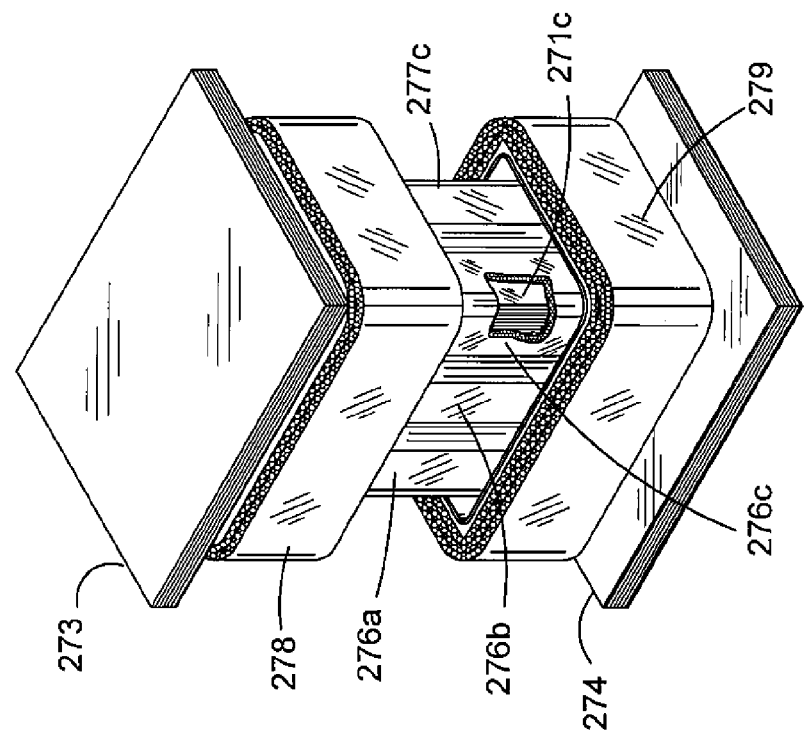
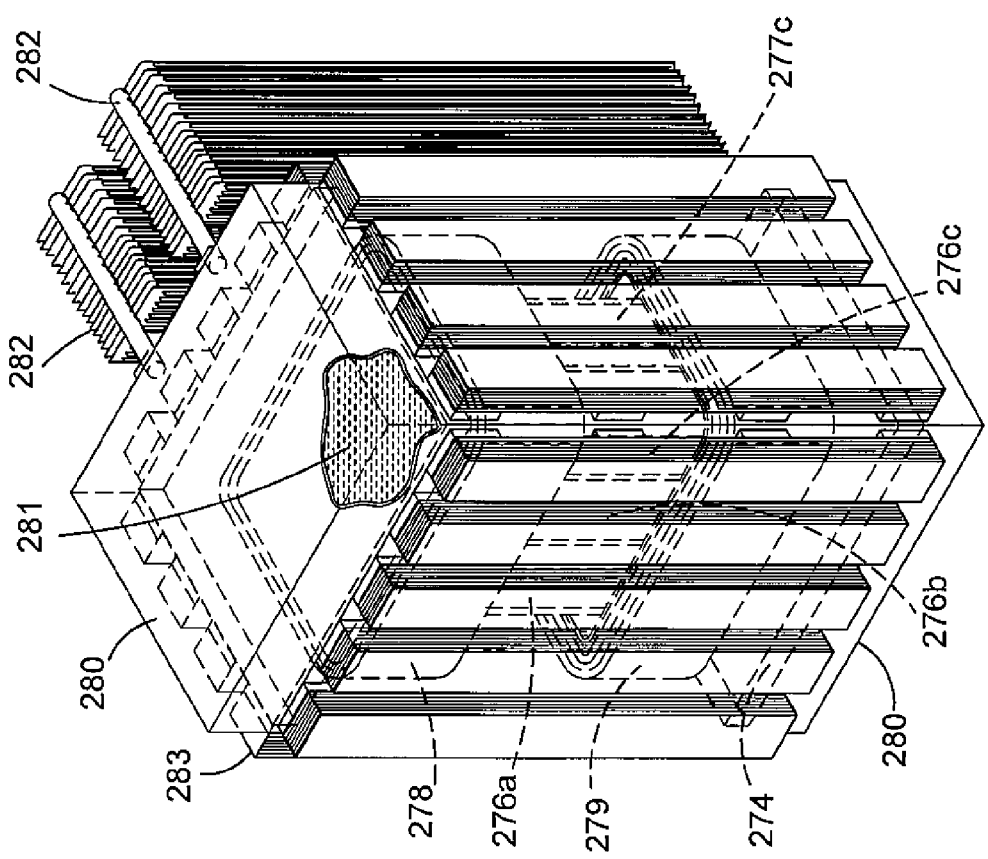

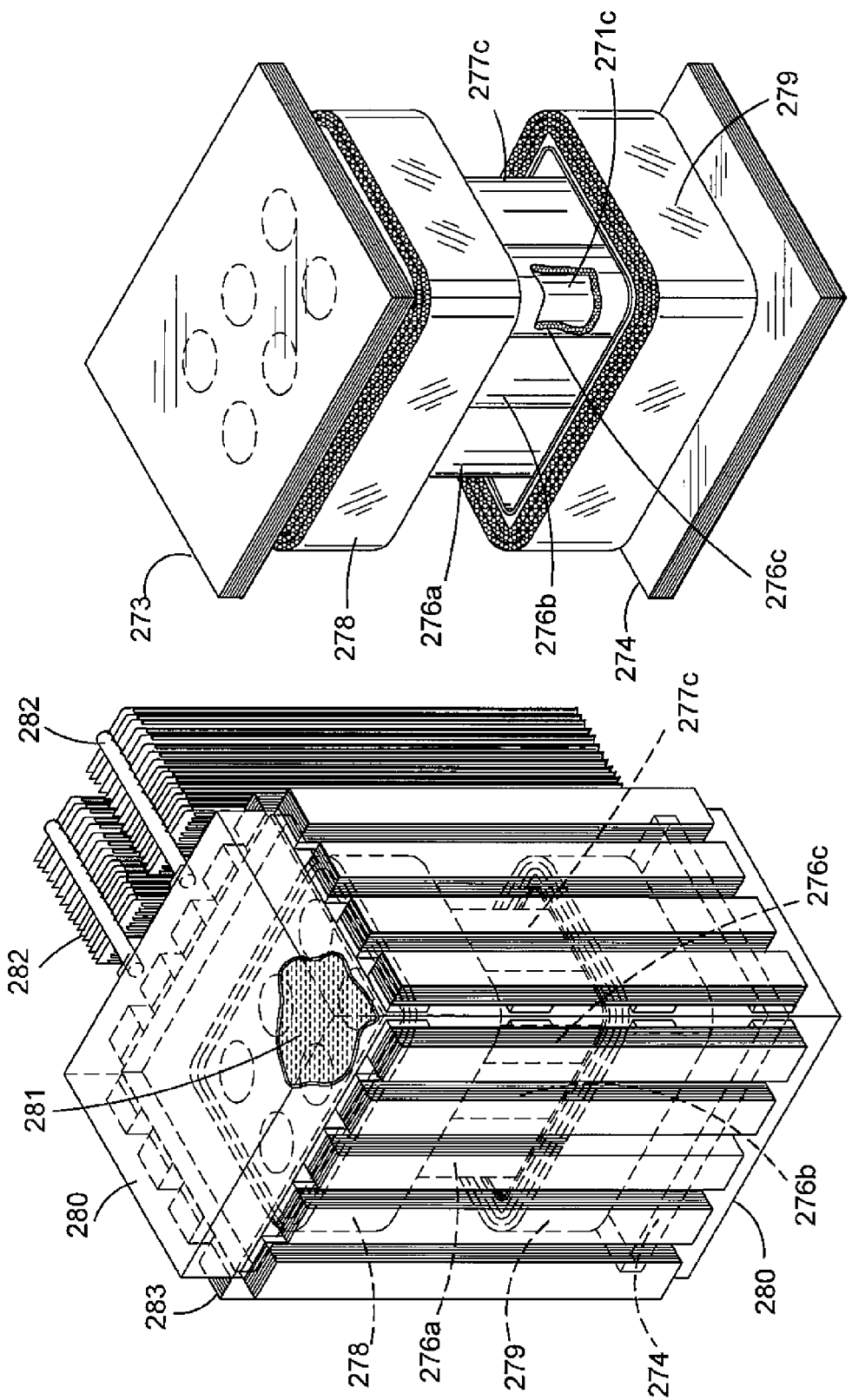

FAULT CURRENT LIMITER

CROSS REFERENCE TO RELATED APPLICATION

This application is a National Stage of International Application No. PCT/AU2012/001498, filed Dec. 7, 2012, which claims priority to Australian Application No. 2011905130, filed Dec. 9, 2011, both of which are hereby incorporated by reference in their entirety.

FIELD OF THE INVENTION

The present invention relates to a fault current limiter (FCL).

The invention has been developed primarily for a compact high voltage fault current limiter and will be described with reference to that application. However, the invention is not limited to that particular field of use and is also suitable for low voltage, medium voltage, extra-high voltage and ultra-high voltage fault current limiters.

BACKGROUND

Any discussion of the prior art throughout the specification should in no way be considered as an admission that such prior art is widely known or forms part of common general knowledge in the field.

It is known to use an FCL in an electrical distribution system (EDS) to protect infrastructure—and in particular to protect a transformer in an EDS—during fault conditions. These FCLs are by necessity large devices that carry the load current at the load voltage and are required to meet all the necessary standards for use at those levels of current and voltage.

Those FCLs that have been developed for commercial use typically include at least one coil of high temperature superconductor (HTS) that is disposed about a core. For laboratory testing purposes there has also been use made of small-scale test devices constructed from more traditional conductors. The latter are, however, not rated for continuous use and are not constructed for practical use in an EDS.

A HTS FCL is typically categorised as an inductive FCL—where the load current flows through a metal coil—or a resistive FCL—where the current flows thought the superconductor coil. For an inductive FCL use is made of a HTS DC bias coil for biasing the core into saturation at least in the vicinity of the metal coil. This bias is such that a flow of current through the metal coil above a given threshold will result in the core being progressed out of saturation which, in turn, will change the inductance of the metal coil and have a limiting affect upon the load current.

The use of a HTS coil is problematic in some applications due to it being more maintenance intensive, more expensive to purchase, more difficult to manufacture, and it requires more overall footprint due to the need for associated cooling equipment.

SUMMARY OF THE INVENTION

It is an object of the present invention to overcome or ameliorate at least one of the disadvantages of the prior art, or to provide a useful alternative.

According to one aspect of the invention there is provided a fault current limiter including:

an input terminal for electrically connecting to a power source that provides a load current;

an output terminal for electrically connecting with a load circuit that draws the load current;

a magnetically saturable core including at least one coil receiving limb disposed intermediate at least two return limbs, wherein the limbs longitudinally extend between at least two yokes, and wherein the at least two yokes and the at least two return limbs define at least a portion of one or more magnetic flux return paths for the at least one coil receiving limb;

at least one AC coil disposed about the at least one coil receiving limb for carrying the load current between the input terminal and the output terminal; and a magnetic biasing system for magnetically biasing the core such that, in response to one or more characteristics of the load current, the at least one AC coil moves from a low impedance state to a high impedance state.

In one embodiment, the core includes two coil receiving limbs and the AC coil includes two coil segments, each coil segment being disposed about a respective coil receiving limb.

In one embodiment, the biasing system includes a DC coil disposed about the two coil receiving limbs.

In one embodiment, the DC coil is disposed about the AC coil and the two coil receiving limbs.

In one embodiment, the biasing system includes two DC coils each disposed about a respective coil receiving limb.

In one embodiment, the two DC coils are each disposed about a respective coil segment and a respective coil receiving limb.

In one embodiment, the biasing system is disposed about at least one of the two yokes.

In one embodiment, the core includes a plurality of spaced apart core segments.

In one embodiment, the core segments are like and each core segment includes at least one coil receiving limb and at least one return limb longitudinally extending between at least two yokes.

In one embodiment, the AC coil includes two coil segments and each coil segment is disposed about one coil receiving limb.

In one embodiment, the biasing system includes a DC coil disposed about the at least one coil receiving limb of each core segment.

In one embodiment, each core segment includes more than one coil receiving limb and the DC coil is disposed about the coil receiving limbs of each core segment.

In one embodiment, the biasing system includes a DC coil disposed about the coil receiving limbs of the core.

In one embodiment, the core, the AC coil and the biasing system are immersed in a dielectric medium.

According to another aspect of the invention there is provided a fault current limiter including:

an input terminal for electrically connecting to a power source that provides a load current;

an output terminal for electrically connecting with a load circuit that draws the load current;

a magnetically saturable core for defining a magnetic circuit having at least one coil receiving portion and at least one return portion;

at least one AC coil disposed about the at least one coil receiving portion for carrying the load current between the input terminal and the output terminal; and at least one metallic coil disposed about the return portion and which is adjacent to and spaced apart from the at least one coil receiving portion for magnetically biasing the core such that, in response to one or more characteristics of the load current, the at least one AC coil moves from a low impedance state to a high impedance state.

In one embodiment, the core includes a first limb and the coil receiving portion extends along at least part of the first limb.

In one embodiment, the core includes a second limb that is parallel with and spaced apart from the first limb and two yokes between which the limbs extend, wherein the second limb and the yokes define at least part of the return portion.

According to another aspect of the invention there is provided a fault current limiter including:

an input terminal for electrically connecting to a power source that provides a load current;

an output terminal for electrically connecting with a load circuit that draws the load current;

a magnetically saturable core for defining a magnetic circuit having at least one coil receiving portion and at least one return portion;

at least one AC coil disposed about the at least one coil receiving portion for carrying the load current between the input terminal and the output terminal; and at least one permanent magnet disposed in the return portion and which is adjacent to and spaced apart from the at least one coil receiving portion for magnetically biasing the core such that, in response to one or more characteristics of the load current, the at least one AC coil moves from a low impedance state to a high impedance state.

In one embodiment, the core includes a first limb and the coil receiving portion extends along at least part of the first limb.

In one embodiment, the core includes a second limb that is parallel with and spaced apart from the first limb and two yokes between which the limbs extend, wherein the second limb and the yokes define at least part of the return portion.

In one embodiment, the permanent magnet is disposed in one or more of the yokes.

In one embodiment, the permanent magnet is disposed in the first limb.

BRIEF DESCRIPTION OF THE DRAWINGS

Embodiments of the invention will now be described, by way of example only, with reference to the accompanying drawings in which:

FIG. 31 is a partially cutaway perspective view of the single phase FCL of FIG. 30;

FIG. 32 is a partially cutaway perspective view showing the coil receiving limbs, yokes, AC coil and DC coils of the FCL of FIG. 30;

FIG. 38 is a partially cutaway perspective view of the three phase FCL of FIG. 37;

FIG. 39 is a partially cutaway perspective view showing the coil receiving limbs, yokes, AC coils and DC coils of the FCL of FIG. 37;

FIG. 41 is a partially cutaway perspective view of the three phase FCL of FIG. 40;

FIG. 42 is a partially cutaway perspective view showing the coil receiving limbs, yokes, AC coils and DC coils of the FCL of FIG. 40;

DETAILED DESCRIPTION

Figure 1:
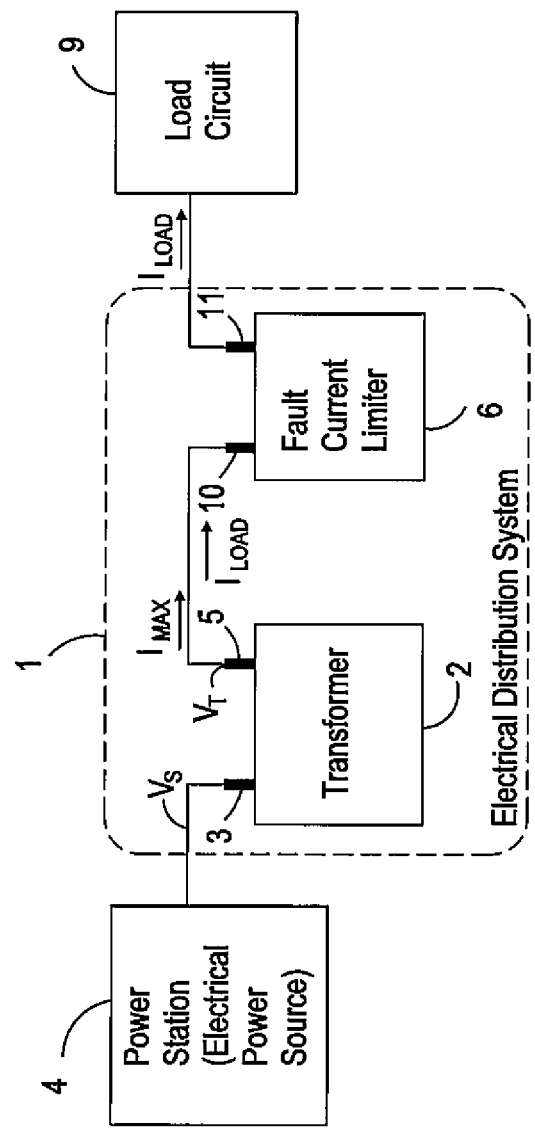
FIG. 1 is a schematic view of a fault current limiter (FCL) according to an embodiment of the invention disposed in an electrical distribution system (EDS)

The following description and Figures make use of reference numerals to assist the addressee understand the structure and function of the illustrated embodiments. Like reference numerals are used in different embodiments to designate features having the same or similar function and/or structure. By way of example only, in FIG. 2 there is no illustration of, amongst other things, the AC terminals and the DC terminals.

The drawings need to be viewed as a whole and together with the associated text in this specification. In particular, some of the drawings selectively omit features to provide greater clarity about the specific features being described. While this is done to assist the reader, it should not be taken that those features are not disclosed or are not required for the operation of the relevant embodiment.

Where use is made of the term "an embodiment" in relation to a feature, that is not to be taken as indicating there is only one embodiment in which that feature is able to be used, or that that feature is not able to be used in combination with other features not illustrated as being in the same embodiment. It will be appreciated by the skilled addressee that while some features are mutually exclusive within a single embodiment, others are able to be combined.

Referring to FIG. 1, there is illustrated an electrical distribution system 1 including a three phase transformer 2 for providing a predetermined maximum operating current $I_{MAX}$ at a predetermined operating voltage $V_T$. Transformer 2 includes three first input terminals 3 (only one shown) for connecting with a three phase electrical power source in the form of a power station 4. The power station provides an operating voltage $V_S$. The transformer also includes three first output terminals 5 (only one shown) that provide a load current $I_{LOAD}$ at the predetermined operating voltage $V_T$. System 1 includes a three phase fault current limiter in the form of FCL 6 that has three spaced apart second input terminals 10 (only one shown) for electrically connecting to respective terminals 5 of transformer 2. FCL 6 also includes three spaced apart second output terminals 11 (only one shown) for electrically connecting the FCL with a load circuit 9, which draws load current $I_{LOAD}$.

The line-to-line voltage $V_S$ in this embodiment is 33 kV RMS AC at 50 Hz. However, in other embodiments different voltages or frequencies are used. Examples of commonly used voltages include 132 kV, 66 kV, 33 kV, 11 kV and many other voltages that will be known to those skilled in the art. The other commonly used frequency is 60 Hz.

Figure 2:
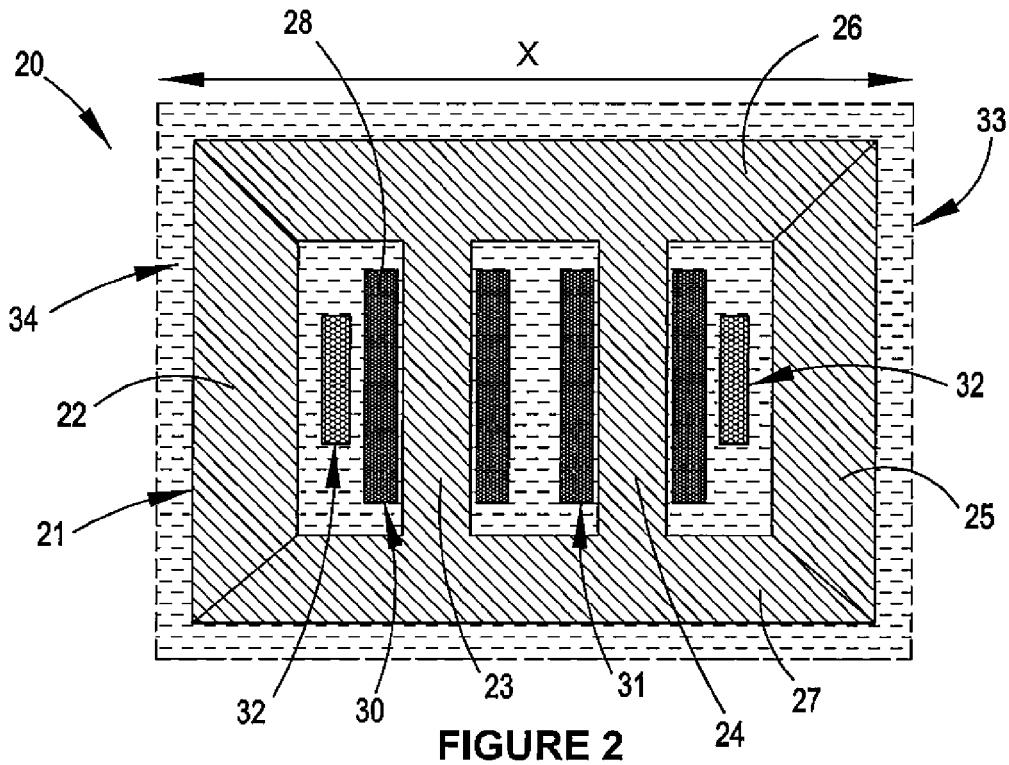
FIG. 2 is a cutaway side view of a single phase FCL according to an embodiment of the invention.

FIG. 2 shows a single phase FCL 20 including a magnetically saturable core 21. Core 21 includes two adjacent elongate and spaced apart generally cylindrical laminated steel coil receiving limbs 23 and 24 which are disposed intermediate and in line with two elongate and spaced apart laminated steel return limbs 22 and 25 that are generally rectangular in cross section. Limbs 22, 23, 24 and 25 longitudinally co-extend between two substantially horizontal laminated steel yokes 26 and 27 that are vertically spaced apart and which also have a generally rectangular cross section. Yokes 26 and 27 and limbs 22 and 25 define two magnetic flux return paths for limbs 23 and 24 respectively. These two magnetic flux return paths define, in combination with limbs 23 and 24, two magnetic circuits.

FCL 20 includes a copper-based insulated AC coil 28 for carrying a load current $I_{LOAD}$ between the input and output terminals of the FCL. Coil 28 includes two series connected and spatially separated coil segments 30 and 31 disposed in opposite sense about respective limbs 23 and 24, where coil 30 is an input coil segment and coil 31 is an output coil segment. A magnetic biasing system, in the form of a copper-based DC coil 32, is disposed about coil 28 and limbs 23 and 24 for magnetically biasing core 21 such that, in response to one or more characteristics of load current $I_{LOAD}$, coil 28 moves from a low impedance state to a high impedance state. Core 21 and coils 28 and 32 are all housed within a tank 33 containing a dielectric medium in the form of a dielectric oil 34.

Although the two magnetic circuits are physically joined by common yokes 26 and 27, the magnetic operation of those circuits is, for practical purposes, separate. However, the integral construction is used, in this embodiment, to gain specific advantages in manufacturing of the FCL. That is, the core structure as shown, having common yokes in the two magnetic circuits, is very similar to manufacture to cores used in transformers. This allows FCL 20 to be manufactured in an existing facility by personnel who are skilled in the transformer art, whereas conventional commercially available FCLs require specialist manufacturing facilities and specialist manufacturing skills. It will be appreciated by those skilled in the art, with the benefit of the present teaching, that a number of changes to the standard transformer manufacturing process are required to accommodate the manufacture of the various FCLs embodiments of the present invention. The heavy construction related to the manufacture of core 21 and coil segments 30 and 31 is familiar to personnel accustomed to the manufacture of transformers, even though those personnel will likely be unfamiliar with both fault current limiters per se and the usual methods of manufacture for such fault current limiters.

In embodiments of the invention, return limbs 22 and 25 are free of AC coils and biasing systems. Such arrangements maintain a low magnetic reluctance path so as to prevent the return limbs from approaching magnetic saturation.

Although the limbs and yokes are illustrated in a generally vertical and horizontal orientation respectively, it will be appreciated by those skilled in the art that different orientations are available.

Figure 3:
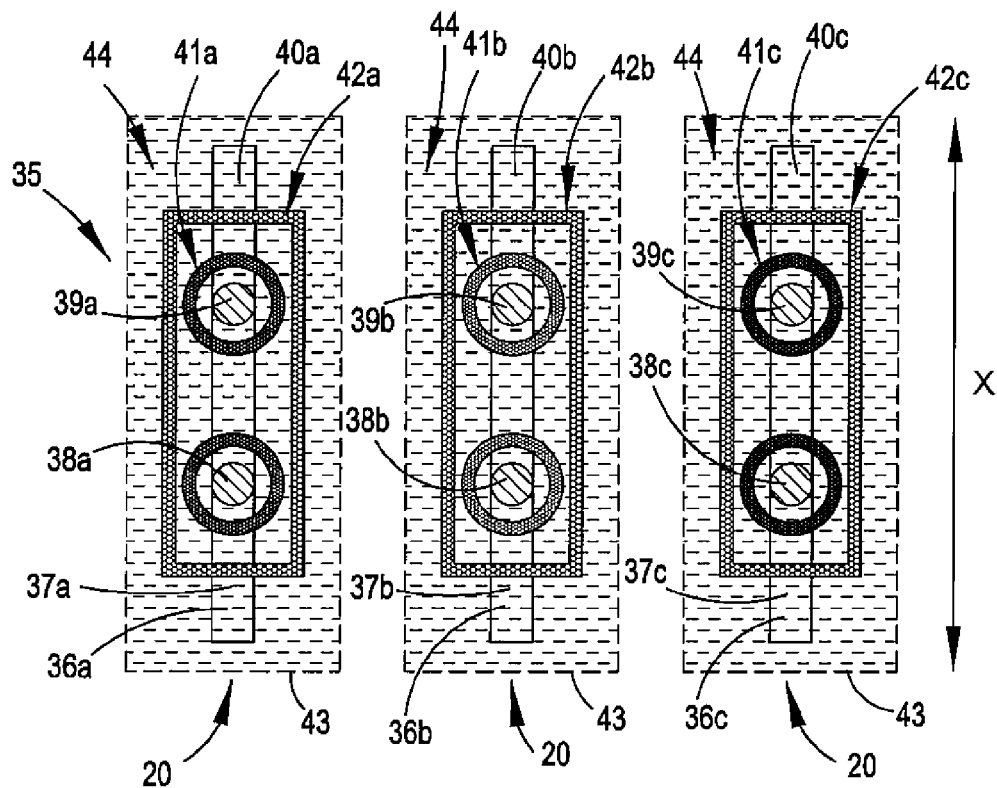
FIG. 3 is a cross-sectional top view of a three phase FCL utilising three like single phase FCLs of FIG. 2.

FIG. 3 shows a three phase FCL 35 utilising three like single phase FCLs 20, one for each phase. Core 36 of FCL 35 includes three like spaced apart core segments 36a, 36b and 36c. Each core segment 36a, 36b and 36c has a similar arrangement to core 21 of FCL 20. That is, core segment 36a includes two elongate coil receiving limbs 38a and 39a disposed intermediate two elongate return limbs 37a and 40a. Core segment 36b similarly includes two elongate coil receiving limbs 38b and 39b disposed intermediate two elongate return limbs 37b and 40b. Furthermore, core segment 36c includes two elongate coil receiving limbs 38c and 39c disposed intermediate two elongate return limbs 37c and 40c. Each core segment 36a, 36b and 36c includes a copper-based insulated AC coil 41, and a copper-based DC coil 42. Each coil 42 of each core segment 36a, 36b and 36c is disposed about a respective coil 41a, 41b and 41c and respective limbs 38a and 39a, 38b and 39b, and 38c and 39c. FCL 35 includes three like tanks 43 containing dielectric medium 44. Each tank 43 is for respectively housing core segment 36a and coils 41a and 42a, core segment 36b and coils 41b and 42b, and core segment 36c and coils 41c and 42c.

Figure 4:
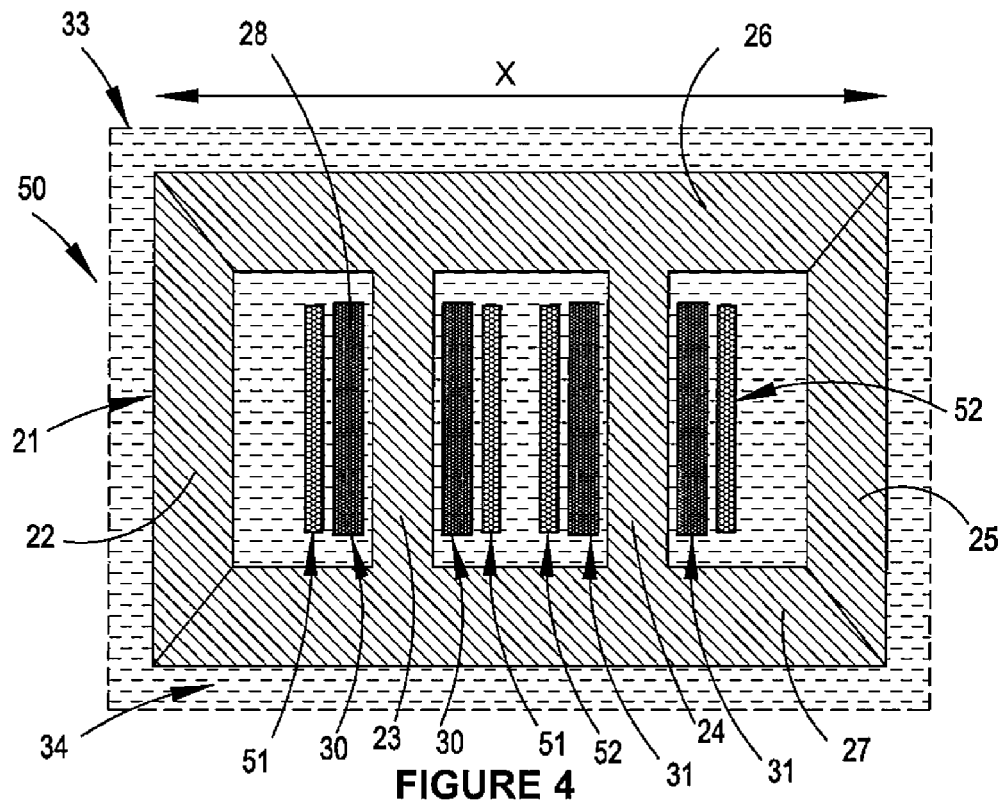
FIG. 4 is a cutaway side view of a single phase FCL according to another embodiment of the invention.

FIG. 4 shows a single phase FCL 50 similar to the FCL of FIG. 2 but where the magnetic biasing system includes two copper-based DC coils 51 and 52. Coil 51 is disposed about coil segment 30 and limb 23, and coil 52 is disposed about coil segment 31 and limb 24.

The use of separate copper-based DC coils reduces manufacturing complexity and allows a standard approach to the design by employing DC coils of lower height. Multiple DC coils are able to be connected electrically in series or parallel, or a combination of both, to achieve the required biasing ampere-turns.

In the embodiment of FIG. 4, coil segments 30 and 31, and coils 51 and 52 are substantially the same height. However, it will be appreciated that in other embodiments, coil segments 30 and 31, and coils 51 and 52 are other than substantially the same height. For example, in some embodiments coil segments 30 and 31 extend longitudinally beyond coils 51 and 52. On the other hand, in some embodiments, coils 51 and 52 extend longitudinally beyond coil segments 30 and 31.

Figure 5:
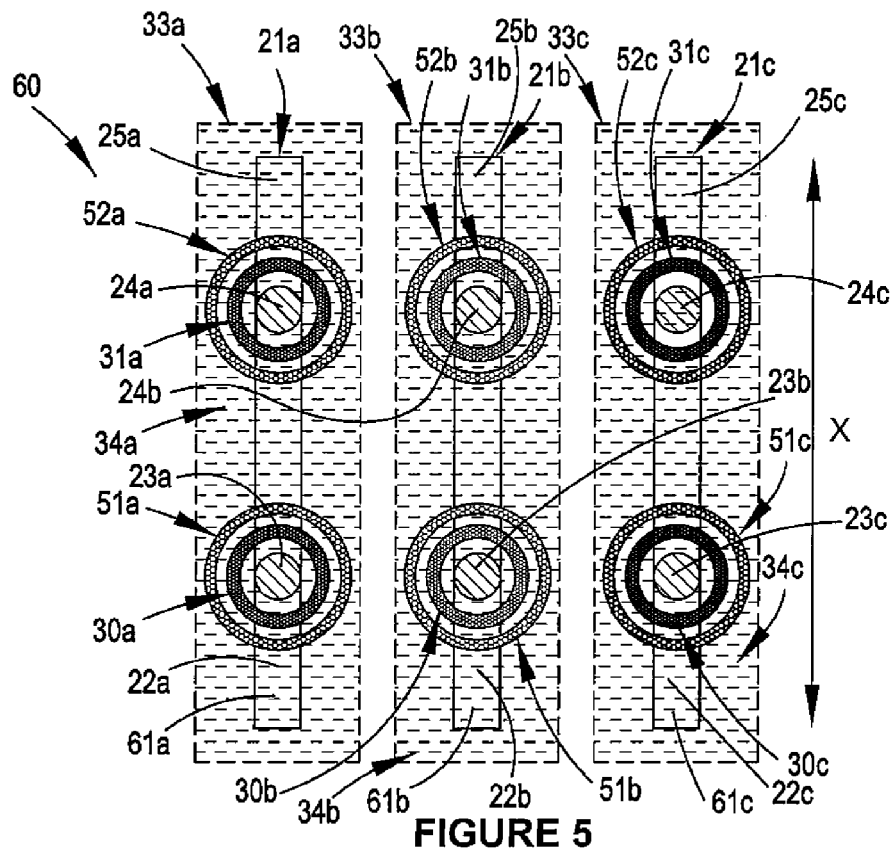
FIG. 5 is a cross-sectional top view of a three phase FCL utilising three like single phase FCLs of FIG. 4.

FIG. 5 shows a three phase FCL 60 utilising three like single phase FCLs 50, one for each phase. As with FCL 35, FCL 60 includes three like spaced apart core segments 61a, 61b and 61c, one core segment for each phase. Each core segment 61a, 61b and 61c has a similar arrangement to core 21 of FCL 50. Core segment 61a includes two elongate coil receiving limbs 23a and 24a disposed intermediate two elongate return limbs 22a and 25a. Similarly, core segment 61b includes two elongate coil receiving limbs 23b and 24b disposed intermediate two elongate return limbs 22b and 25b. Furthermore, core segment 61c includes two elongate coil receiving limbs 23c and 24c disposed intermediate two elongate return limbs 22c and 25c. Core segment 61a includes two DC coils 51a and 52a each disposed about a respective coil segment 30a and 31a and a respective limb 23a and 24a. Core segment 61b includes two DC coils 51b and 52b. Coil 51b is disposed about coil segment 30b and limb 23b, and coil 52b is disposed about coil segment 31b and limb 24b. Core segment 61c includes two DC coils 51c and 52c each disposed about respective coil segments 30c and 31c and respective limbs 23c and 24c. FCL 60 includes three like tanks 33a, 33b and 33c each containing dielectric medium 44a, 44b and 44c. Tank 33a houses core segment 61a, coil segments 30a and 31a, and coils 51a and 52a. Tank 33b similarly houses core segment 61b, coil segments 30b and 31b, and coils 51b and 52b. Finally, tank 33c houses core segment 61c, coil segments 30c and 31c, and coils 51c and 52c.

Figure 6:
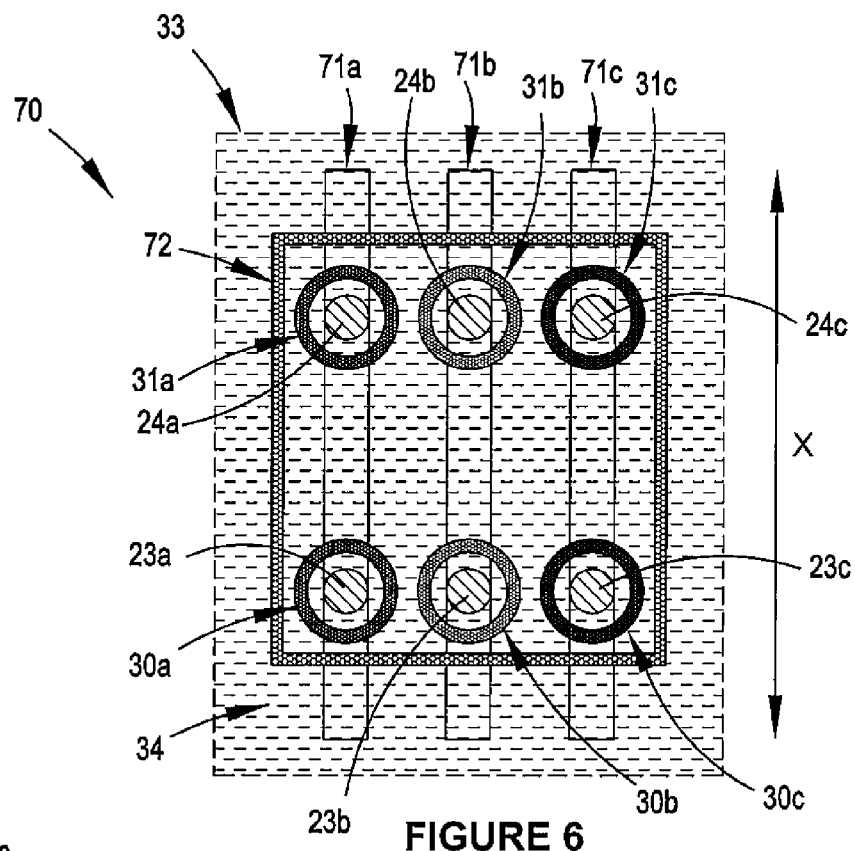
FIG. 6 is a cross-sectional top view of a three phase FCL according to an embodiment of the invention.

FIG. 6 shows a three phase FCL 70 having three like spaced apart core segments 71a, 71b and 71c. As with FCL 60, each core segment 71a, 71b and 71c has a similar arrangement to core 21 of FCL 50. Again, as with FCL 60, coil segments 30a and 31a of FCL 70 are respectively disposed about limbs 23a and 24a. Additionally, coil segments 30b and 31b of FCL 70 are respectively disposed about limbs 23b and 24b. Finally, coil segments 30c and 31c of FCL 70 are respectively disposed about limbs 23c and 24c. FCL 70 includes one copper-based DC coil 72 for magnetically biasing core segments 71a, 71b and 71c. Coil 72 is disposed about all six coil segments 30a, 31a, 30b, 31b, and 30c, 31c, and all six limbs 23a, 24a, 23b, 24b, 23c and 24c. All three segments 71a, 71b and 71c, coil segments 30a, 31a, 30b, 31b, and 30c, 31c and coil 72 are housed in a single tank 33 containing oil 34.

Figure 7:
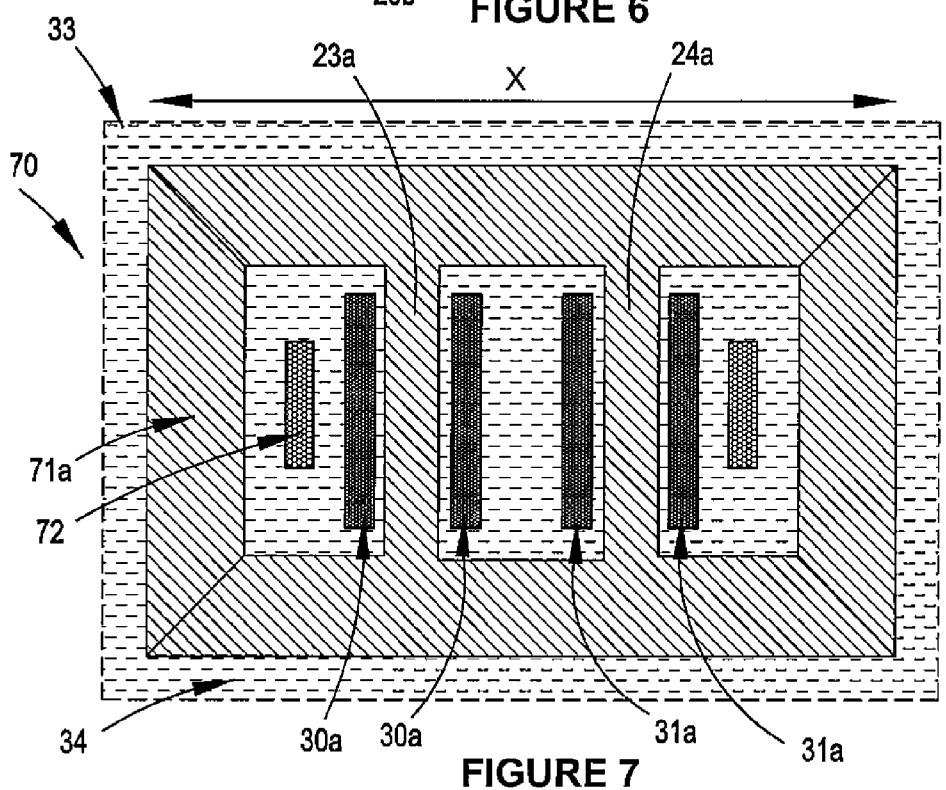
FIG. 7 is a cross-sectional side view of the FCL of FIG. 6.

FIG. 7 shows a cross-sectional side view of core segment 71a of FCL 70.

Figure 8:
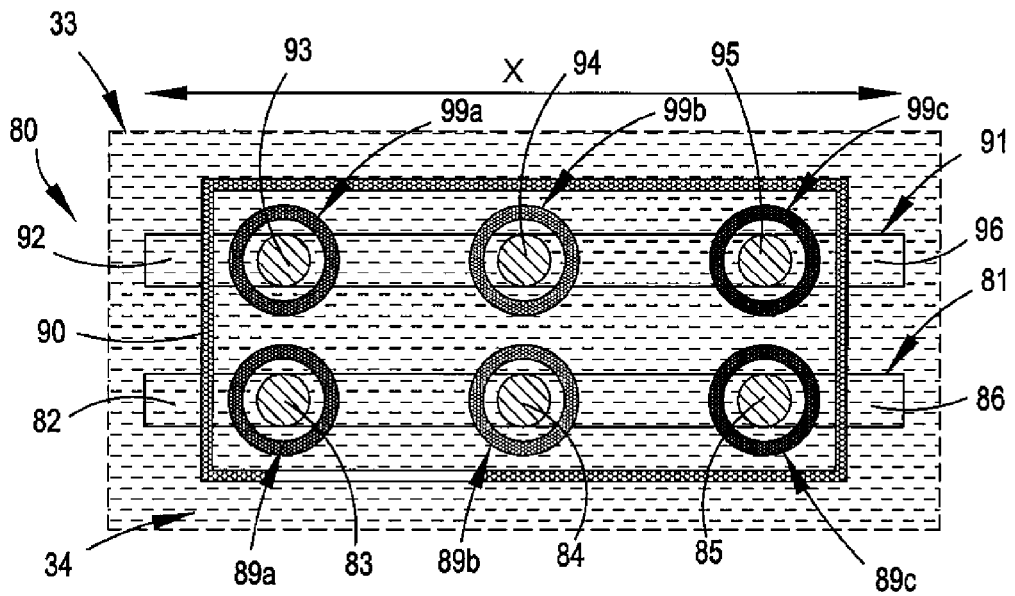
FIG. 8 is a cross-sectional top view of a three phase FCL according to another embodiment of the invention.
Figure 9:
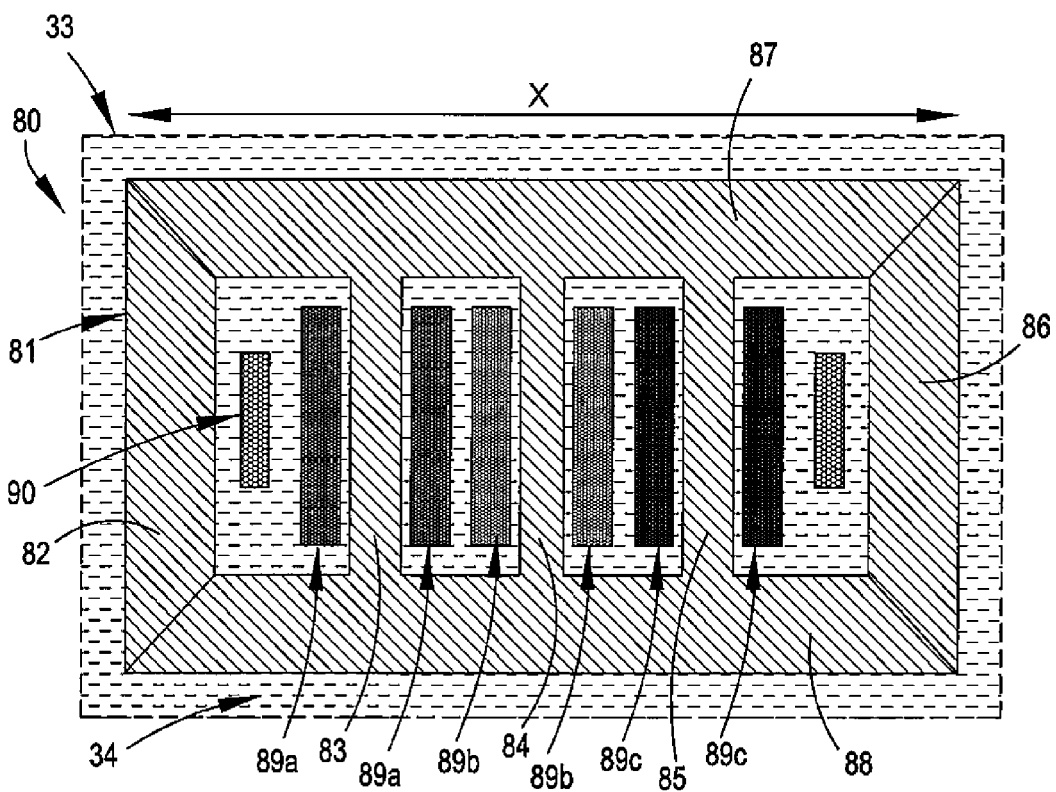
FIG. 9 is a cross-section side view of the three phase FCL of FIG. 8.

FIG. 8 shows a three phase FCL 80 according to another embodiment of the invention. FCL 80 includes two magnetically saturable core segments 81 and 91. Core segment 81 includes three elongate coil receiving limbs 83, 84 and 85 disposed intermediate two elongate return limbs 82 and 86. As best shown in FIG. 9, limbs 82, 83, 84, 85 and 86 longitudinally extend between two yokes 87 and 88. Referring again to FIG. 8, core segment 91 includes three elongate coil receiving limbs 93, 94 and 95 disposed intermediate two elongate return limbs 92 and 96. FCL 80 includes three copper-based insulated AC coils respectively having two coil segments 89a and 99a, 89b and 99b, and 89c and 99c. Coils 89a, 89b and 89c are input coil segments, and coils 99a, 99b and 99c are output coil segments. Coil segments 89a and 99a, 89b and 99b, and 89c and 99c are respectively disposed about limbs 83 and 93, 84 and 94, and 85 and 95. FCL 80 includes a magnetic biasing system in the form of a single copper-based DC coil 90 for magnetically biases core segments 81 and 91. Coil 90 is disposed about all six coil segments 89a, 99a, 89b, 99b, and 89c, 99c, and all six limbs 83, 93, 84, 94, 85 and 95. Both segments 81 and 91, coil segments 89a, 99a, 89b, 99b, and 89c, 99c and coil 90 are housed in a single tank 33 containing oil 34.

Figure 10:
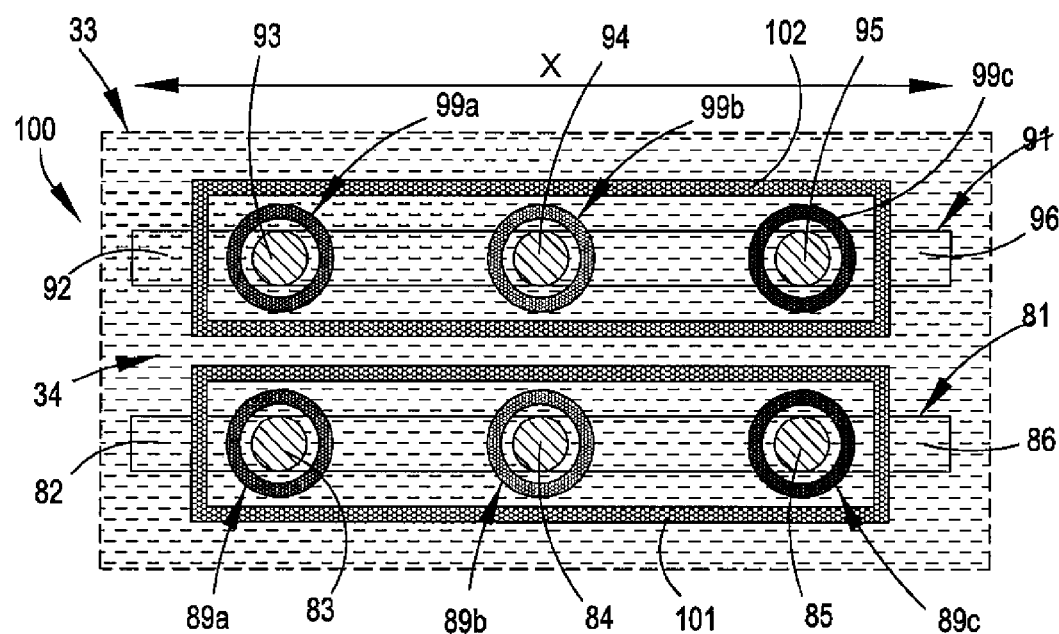
FIG. 10 is a cross-sectional top view of a three phase FCL according to another embodiment of the invention.

FIG. 10 shows a three phase FCL 100 similar to FIG. 8 but where the magnetic biasing system includes two copper-based DC coils 101 and 102. In this embodiment, coil 101 magnetically biases core segment 81, and coil 102 magnetically biases core segment 91. Coil 101 is disposed about input coil segments 89a, 89b and 89c, and limbs 83, 84 and 85. On the other hand, coil 102 is disposed about output coil segments 99a, 99b and 99c, and limbs 93, 94 and 95. In this embodiment, both core segments 81 and 91, coil segments 89a, 99a, 89b, 99b, and 89c, 99c and coils 101 and 102 are housed in a single tank 33 containing oil 34.

It will be appreciated that in other embodiments FCL 100 includes two tanks, one tank for housing core segment 81, input coil segments 89a, 89b and 89c and coil 101, and one tank for housing core segment 91, output coil segments 99a, 99b and 99c and coil 102. Accordingly, in such embodiments, FCL 100 includes two separate units, one input unit and one output unit.

Figure 11:
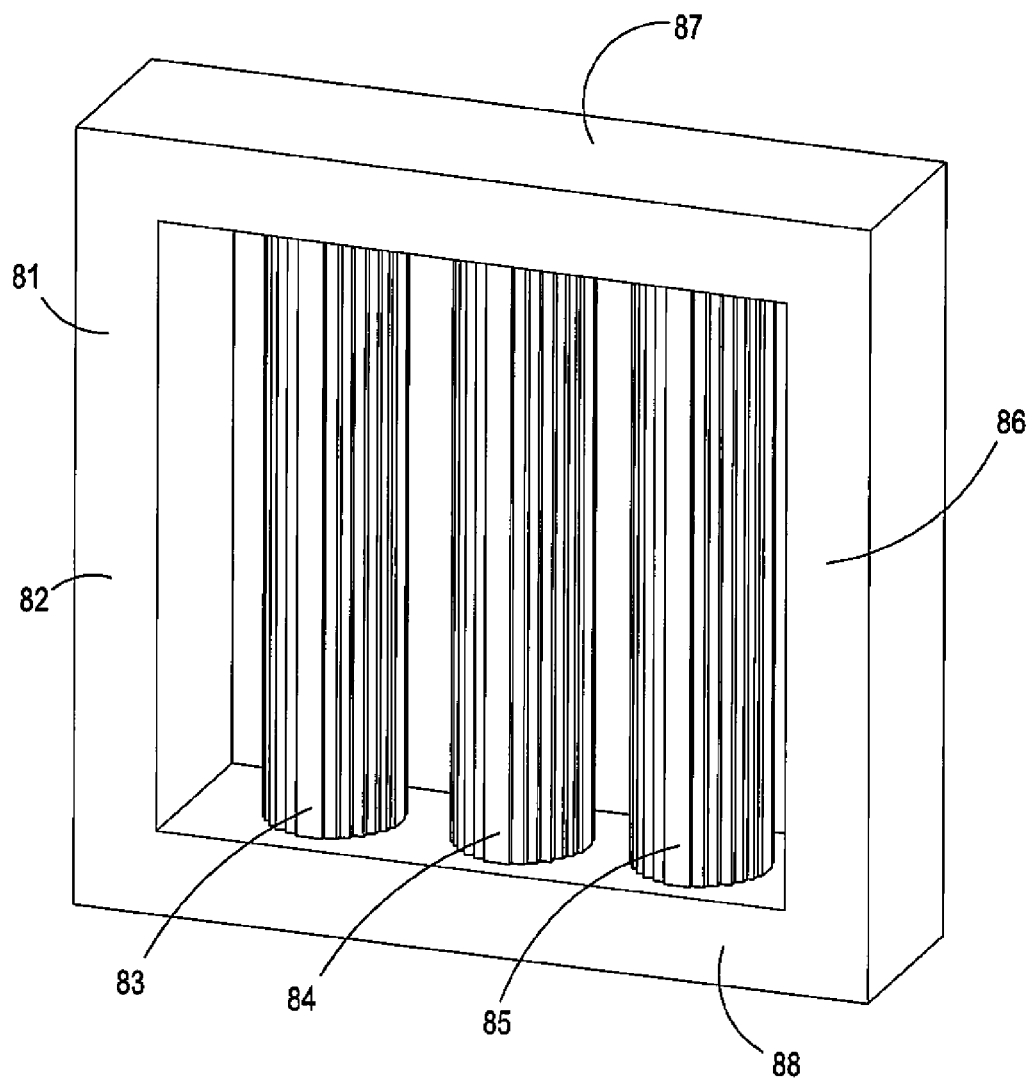
FIG. 11 is a perspective view of the core segment shown in FIG. 9.

FIG. 11 shows core segment 81 of FCL 80. In this particular embodiment, limbs 83, 84 and 85 are generally cylindrical, having a substantially circular cross-sectional area. However, it will be appreciated that in other embodiments, limbs 83, 84 and 85 are other than generally cylindrical, having other than a substantially circular cross-sectional area. For example, in some embodiments, limbs 83, 84 and 85 have a substantially rectangular cross-sectional area, and in other embodiments, limbs 83, 84 and 85 have a substantially square cross-sectional area.

Furthermore, the diameter of limbs 83, 84 and 85 is less than the width of yokes 87 and 88. However, it will be appreciated that in other embodiments, the diameter or width of limbs 83, 84 and 85 is substantially equal to or greater than the width of yokes 87 and 88. Limbs 83, 84 and 85 are formed of stacked mild steel laminations. In some embodiments, the laminations are orientated transformer laminations. In other embodiments, the laminations are non-orientated laminations such as the steel laminations sold under the trademark LYCORE. However, it will be appreciated that other non-orientated lamination materials are used in some embodiments of the invention. Furthermore, it will be appreciated that in some embodiments, core segment 81 is formed entirely of steel laminations sold under the trademark LYCORE. However, it will be appreciated, that core segment 81 may be formed of other materials. It will also be appreciated that, in some embodiments, limbs 83, 84 and 85 are formed of a material different to limbs 82 and 86.

Figure 12:
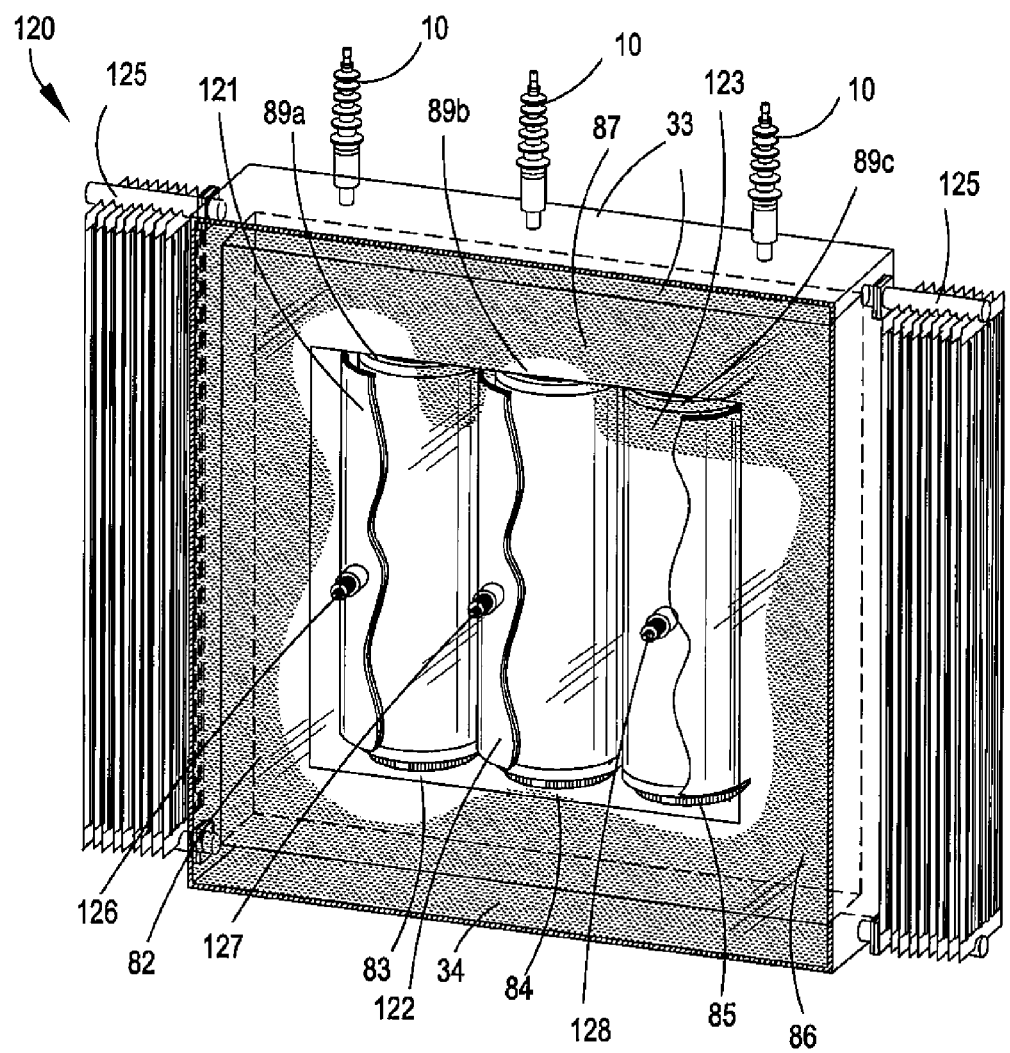
FIG. 12 is a partially cutaway perspective view of a FCL according to an embodiment of the invention.

FIG. 12 shows a FCL 120 according to another embodiment of the invention. FCL 120 includes the magnetically saturable core segment 81 of FIG. 11. That is, core segment 81 of FCL 120 includes three elongate coil receiving limbs 83, 84 and 85 disposed intermediate two elongate return limbs 82 and 86. Limbs 82, 83, 84, 85 and 86 longitudinally extend between two yokes 87 and 88. FCL 120 includes three input coil segments 89a, 89b and 89c each respectively disposed about limbs 83, 84 and 85. FCL 120 further includes a magnetic biasing system which includes three copper-based DC coils 121, 122 and 123 each respectively having a DC input terminal 126, 127 and 128. Coils 121, 122 and 123 are each respectively disposed about coil segment 89a and limb 83, coil segment 89b and limb 84, and coil segment 89c and limb 85. Core segment 81, input coil segments 89a, 89b and 89c and coils 121, 122, and 123 are all housed in tank 33 containing oil 34. Tank 33 includes three spaced apart AC input terminals 10 and two cooling radiators 125. The radiators extend horizontally outwardly from opposite sides of tank 33 and are in fluidic communication with the tank for allowing cooling of oil 34. It will be appreciated that oil 34 circulates from tank 33 and through both radiators through convection currents that are set up through the non-uniform heating of the oil. That is, the oil moves from the top of the tank and into one of the radiators through a respective upper oil feed pipe. As the oil cools in the radiator, it falls toward the bottom of that radiator. Then the cooled oil is progressed back into the bottom of tank via a lower oil feed pipe. Tank 33 includes headroom to accommodate thermal expansion of oil 34 during the operation of FCL 120. In other embodiments, the thermal expansion is accommodated by a separate reservoir that is fluidically connected to tank 33.

Figure 13:
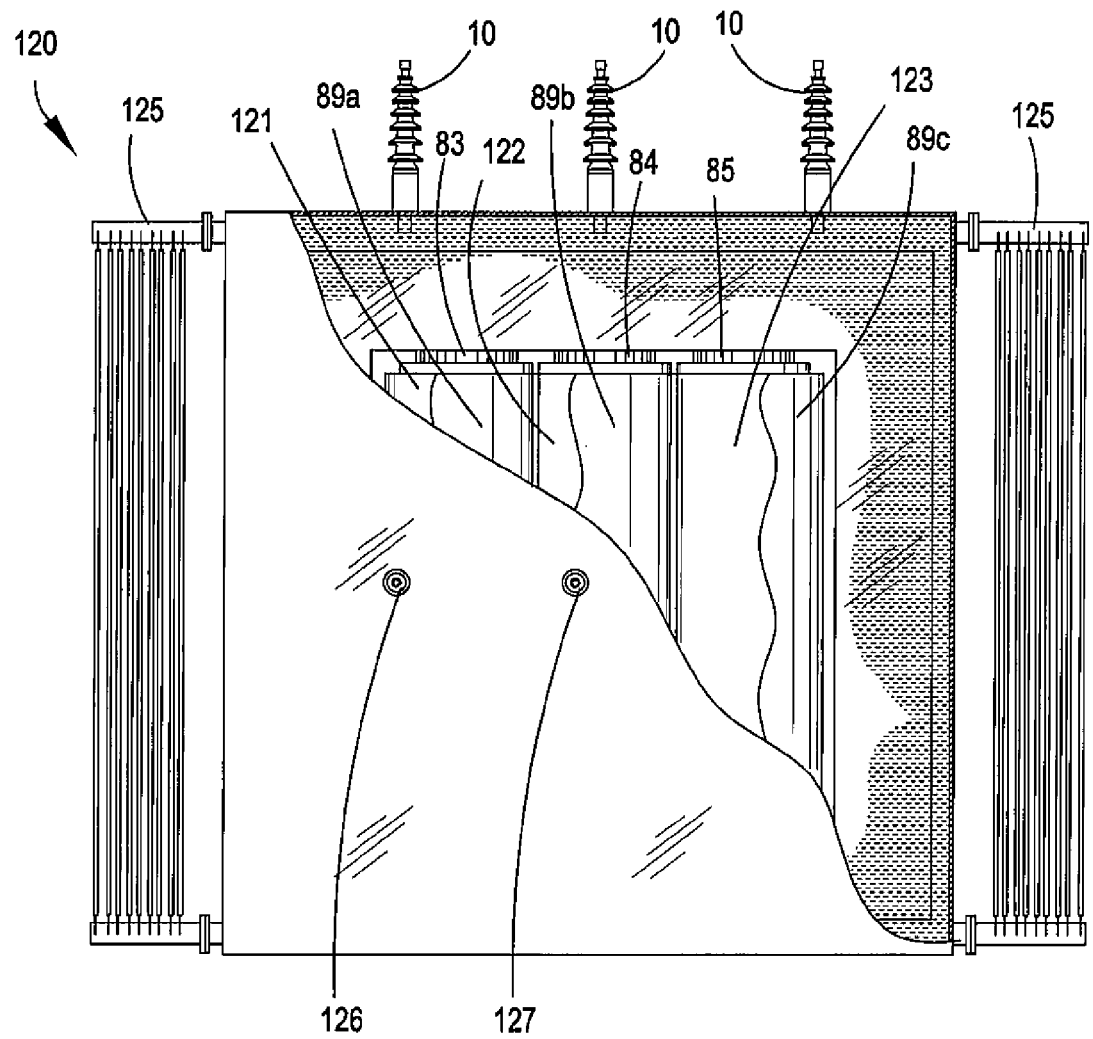
FIG. 13 is a partially cutaway side view of the FCL of FIG. 12.

FIG. 13 shows a partially cutaway side view of FCL 120 of FIG. 12.

Figure 14:
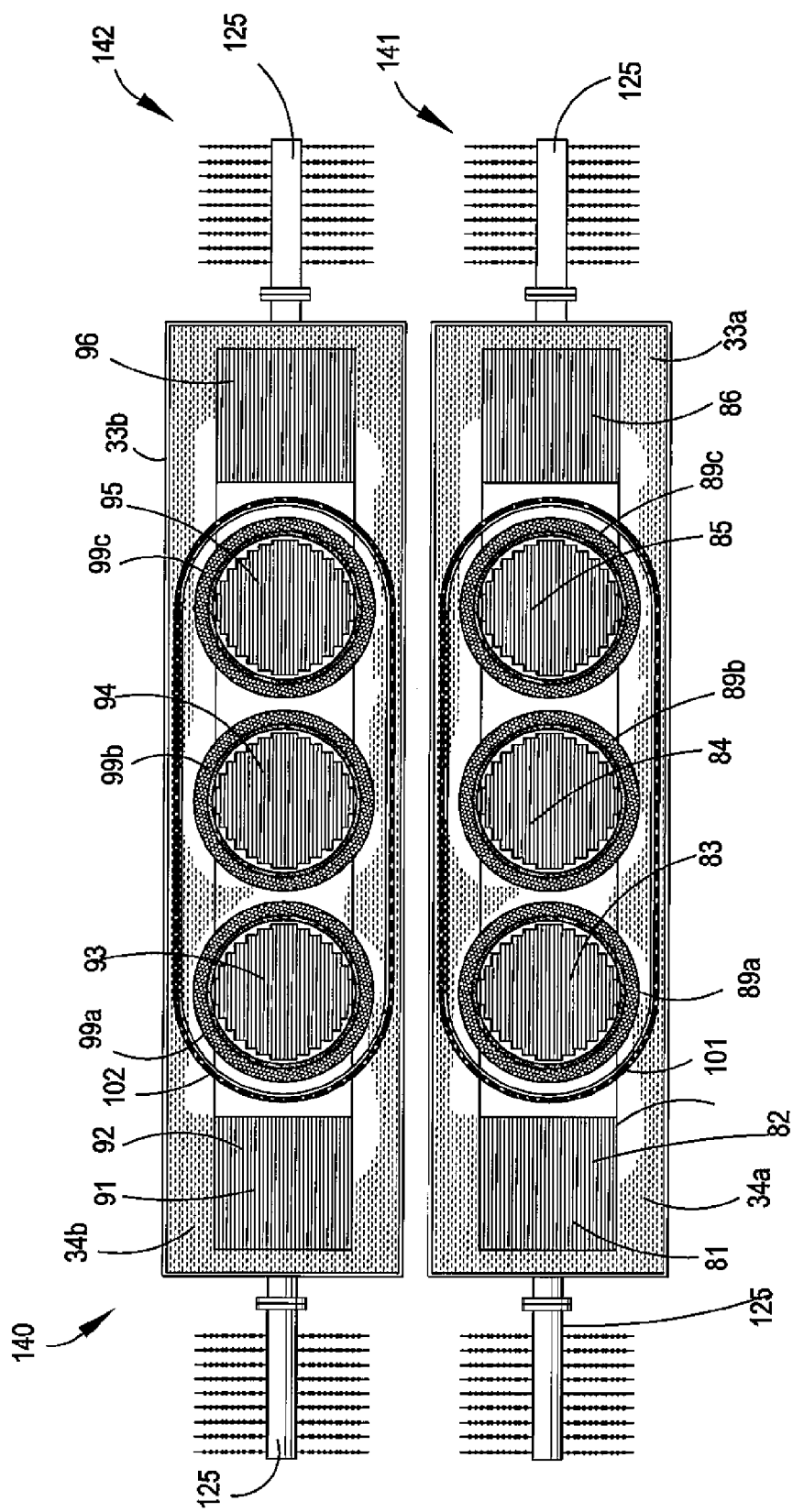
FIG. 14 is a cross-sectional top view of a three phase FCL according to an embodiment of the invention.

FIG. 14 shows a three phase FCL 140 similar to FCL 100 of FIG. 10 but including two tanks 33a and 33b. Tank 33a houses core segment 81, input coil segments 89a, 89b and 89c and coil 101, and tank 33b houses core segment 91, output coil segments 99a, 99b and 99c and coil 102. Accordingly, in such embodiments, FCL 140 includes two separate units, one input unit 141 and one output unit 142. The width of limbs 83, 84, 85, 93, 94 and 95 are substantially the same as the width of the yokes. Accordingly, coil segments 89a, 89b and 89c and coil 101 are disposed about limbs 83, 84 and 85 such that they extend beyond the width of the yokes. Similarly, coil segments 99a, 99b and 99c and coil 102 are disposed about limbs 93, 94 and 95 such that they extend beyond the width of the yokes.

Figure 15:
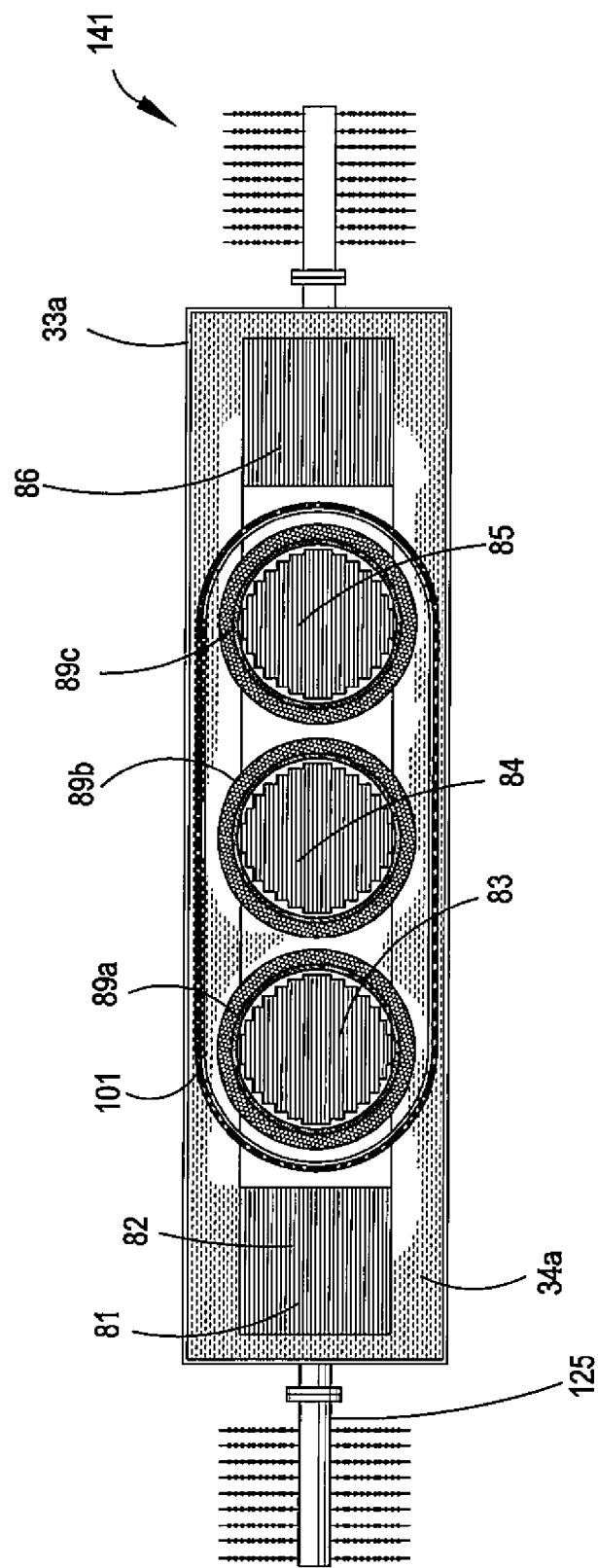
FIG. 15 is a cross-sectional top view of the input unit of the FCL of FIG. 14.

FIG. 15 shows input unit 141 of FCL 140. Although the width of each limb 83, 84 and 85 is substantially the same as the width of the yokes, it will be appreciated that the width of limbs 83, 84 and 85 may be less than the width of the yokes in other embodiments. In some embodiments where the width of limbs 83, 84 and 85 is less than the width of the yokes, such as core segment 81 shown in FIG. 11, coil segments 89a, 89b and 89c lie substantially within the width of the yokes, and only coil 101 extends beyond the width of the yokes. However, in other embodiments, coil segments 89a, 89b and 89c and coil 101 lie substantially within the width of the yokes. It will be appreciated that the coil segments and DC coils extend beyond the width of the yokes at varying degrees in embodiments of the invention.

Figure 16:
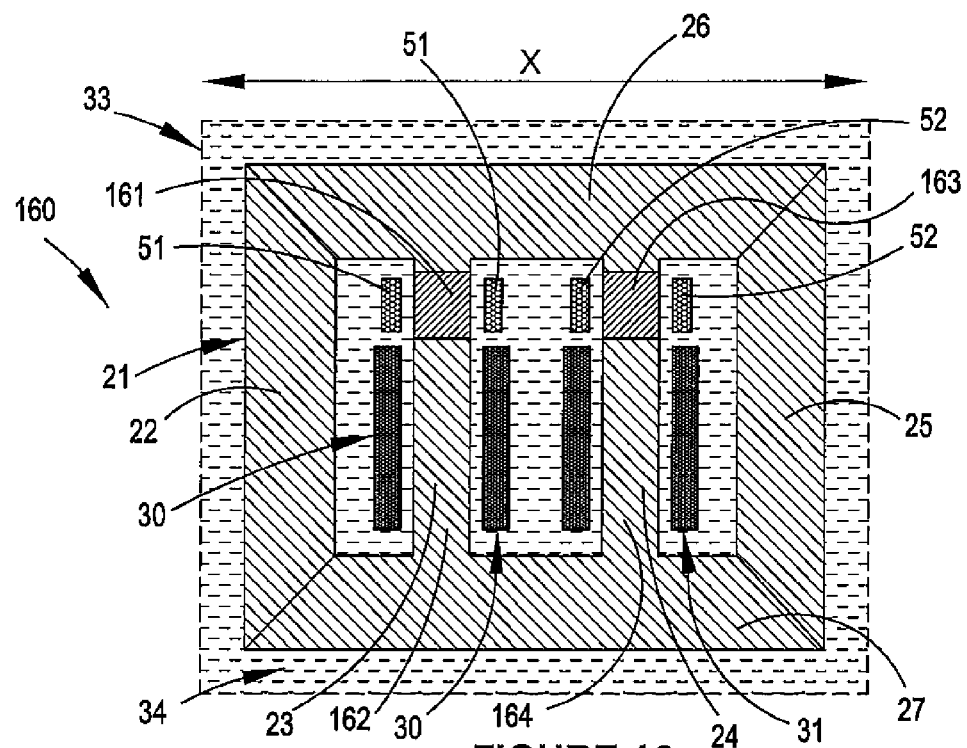
FIG. 16 is a cutaway side view of a single phase FCL according to another embodiment of the invention.

FIG. 16 shows a single phase FCL 160 similar to FIG. 4 but where coil 51 is longitudinally spaced apart from and adjacent to coil segment 30 and disposed about limb 23. Coil 52 is similarly longitudinally spaced apart from and adjacent to coil segment 31 and disposed about limb 24. In this embodiment, portion 161 of limb 23 where coil 51 is disposed is formed of a different material to portion 162 where coil segment 30 is disposed. Similarly, portion 163 of limb 24 where coil 52 is disposed is formed of a different material to portion 164 where coil segment 31 is disposed. Portions 161 and 163 are formed of a non-laminated magnetic material to prevent AC power frequency magnetic flux to pass while allowing DC bias flux to pass.

Figure 17:
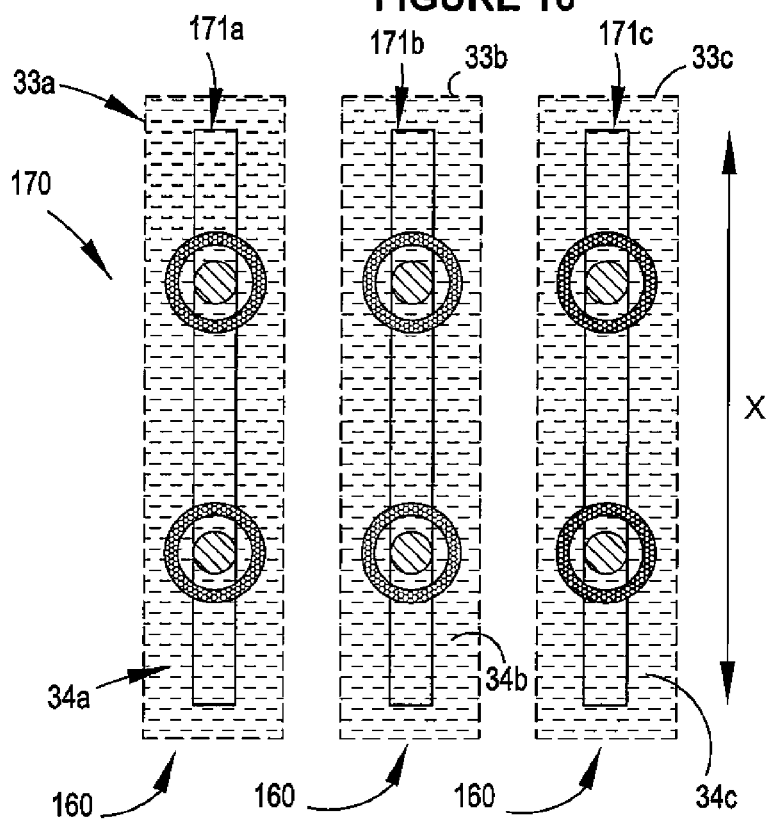
FIG. 17 is a cross-sectional top view of a three phase FCL utilising three like single phase FCLs of FIG. 16.

FIG. 17 shows a three phase FCL 170 utilising three like single phase FCLs 160, one for each phase. FCL 170 includes three like spaced apart core segments 171a, 171b and 171c. Each core segment 171a, 171b and 171c has a similar arrangement to core 21 of FCL 160.

Figure 18:
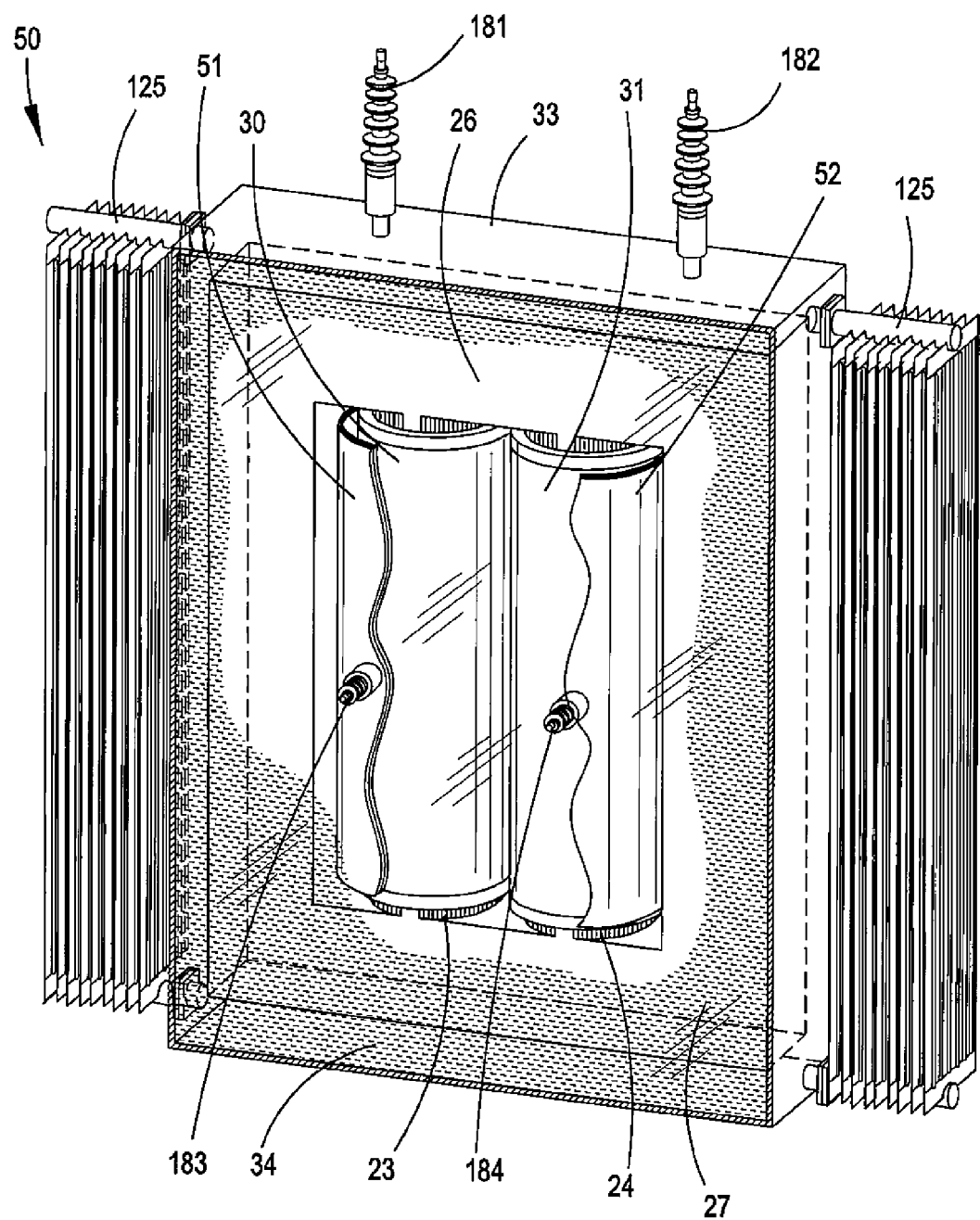
FIG. 18 is a partially cutaway perspective view of the single phase FCL of FIG. 4.
Figure 19:
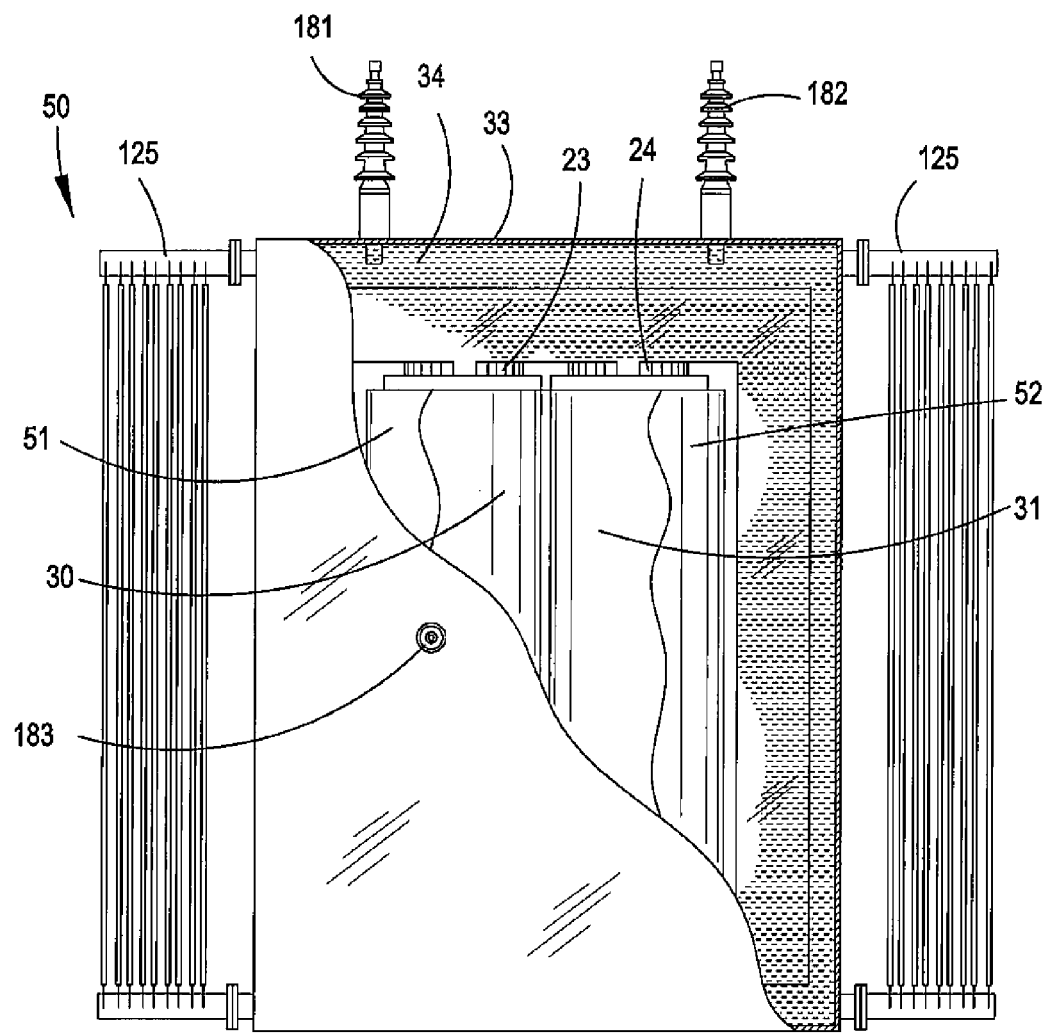
FIG. 19 is a partially cutaway side view of the single phase FCL of FIG. 4.

FIG. 18 shows a partially cutaway perspective view of single phase FCL 50 shown in FIG. 4. Tank 33 includes an AC input terminal 181 and an AC output terminal 182, and two cooling radiators 125. Coil 51 includes DC input terminal 183, and coil 52 includes DC input terminal 183. In this embodiment, the width of each limb 23 and 24 is substantially the same as the width of yokes 26 and 27. Accordingly, coil segments 30 and 31 and coils 51 and 52 extend beyond the width of yokes 26 and 27. FIG. 19 shows a partially cutaway side view of FIG. 18.

Figure 20:
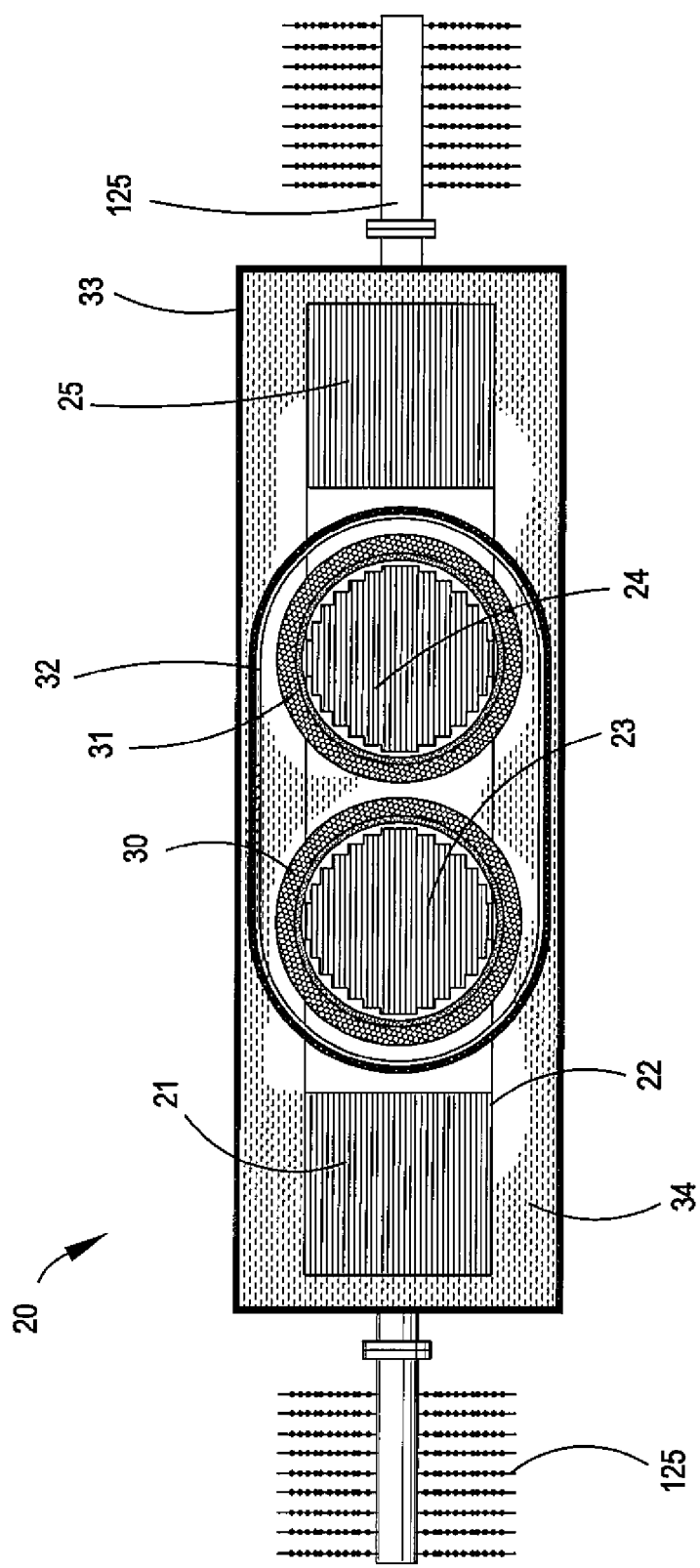
FIG. 20 is a cross-sectional top view of the single phase FCL of FIG. 2.

FIG. 20 shows a cross-sectional top view of single phase FCL 20 shown in FIG. 2. The width of each limb 23 and 24 is substantially the same as the width of the yokes, such that coil 32 and coil segments 30 and 31 extend beyond the width of the yokes. Tank 33 includes two cooling radiators 125.

Figure 21:
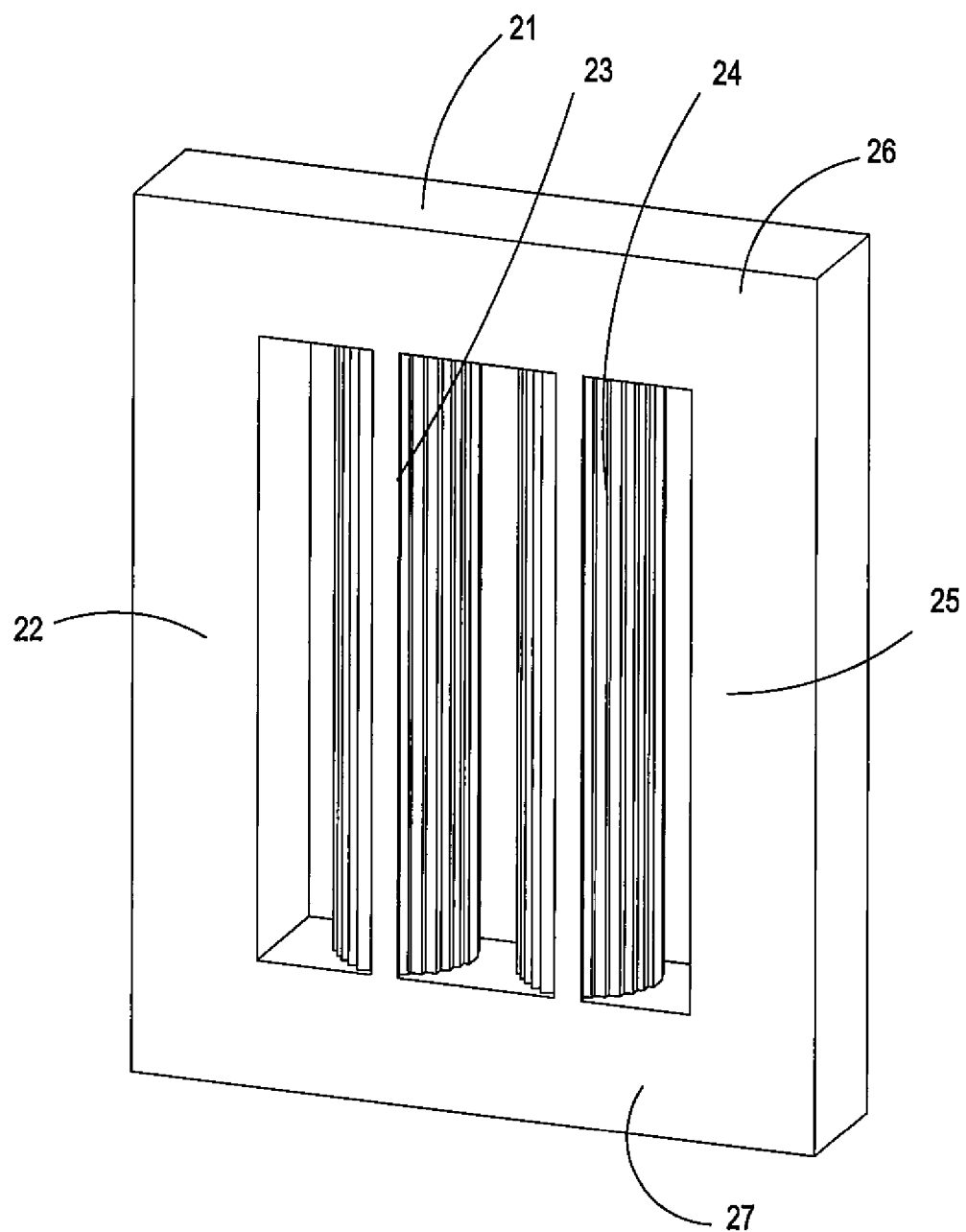
FIG. 21 a perspective view of the core shown in FIG. 20.

FIG. 21 shows core 21 of FCL 20, and best illustrates the width of limbs 23 and 24 being substantially the same as the width of yokes 26 and 27. Limbs 23 and 24 are generally cylindrical and have a substantially circular cross-sectional area. However, it will be appreciated that in other embodiments, the limbs are other than generally cylindrical and have other than a substantially circular cross-sectional area. Limbs 23 and 24 are formed of stacked laminations. In some embodiments, the laminations are orientated transformer laminations. In other embodiments, the laminations are non-orientated laminations such as the steel laminations sold under the trademark LYCORE. However, it will be appreciated that other non-orientated lamination materials are used in some embodiments of the invention. Furthermore, it will be appreciated that in some embodiments, core 21 is formed entirely of steel laminations sold under the trademark LYCORE. However, it will be appreciated, that core 21 may be formed of other materials. It will also be appreciated that, in some embodiments, limbs 23 and 24 are formed of a material different to limbs 22 and 25.

Figure 22:
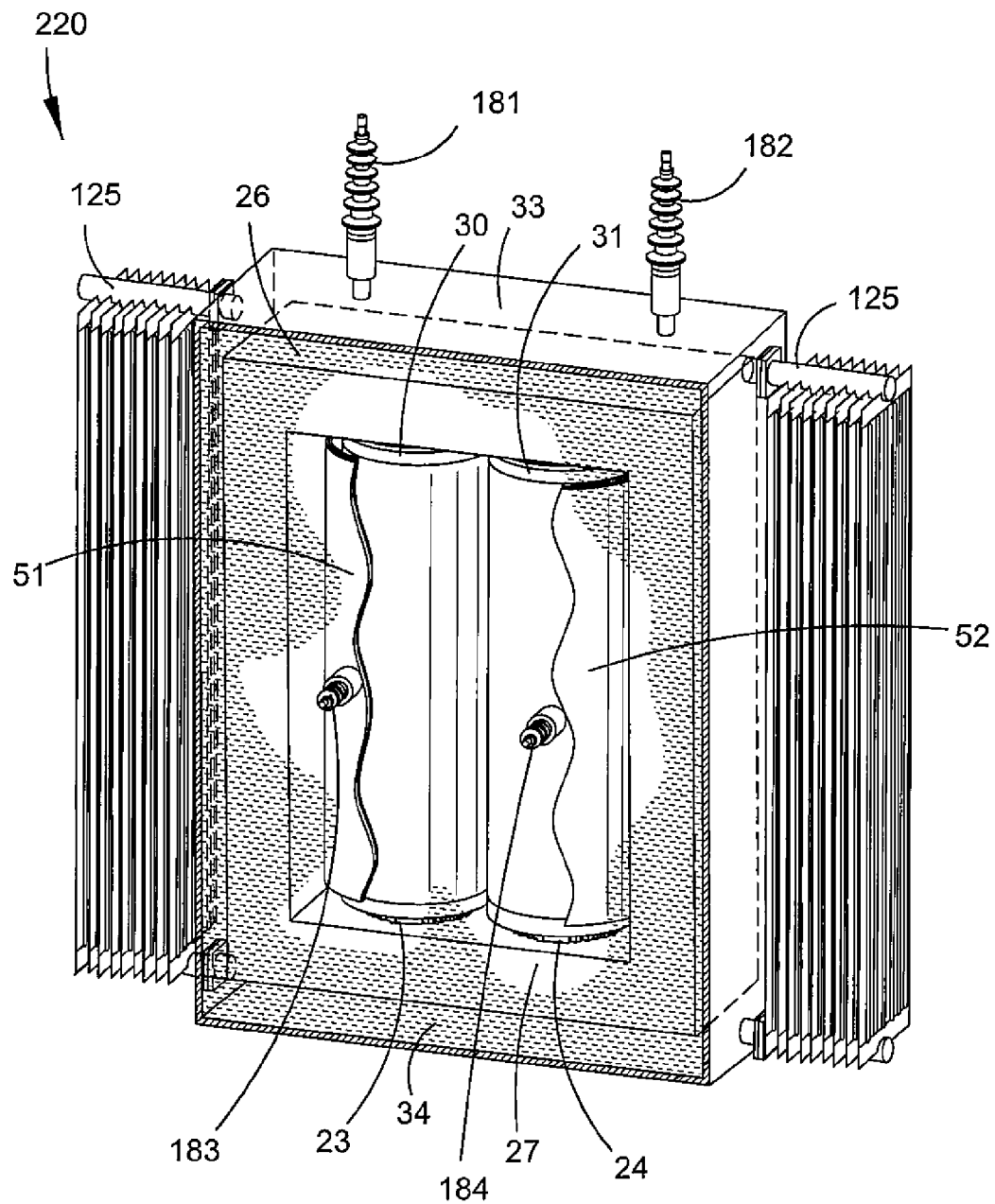
FIG. 22 is a partially cutaway perspective view of the single phase FCL according to another embodiment of the invention.
Figure 23:
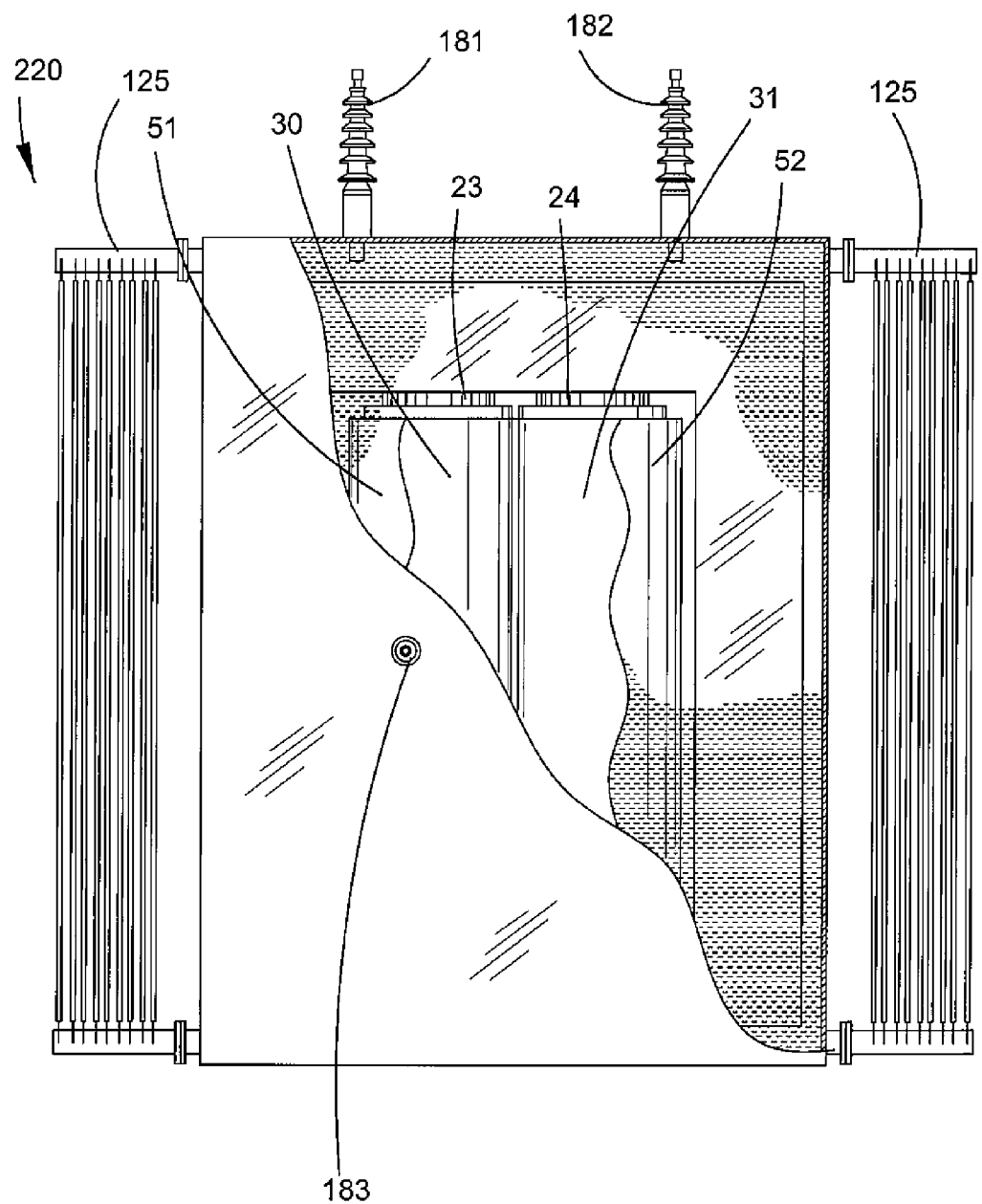
FIG. 23 is a partially cutaway side view of the single phase FCL of FIG. 22.

FIG. 22 shows a single phase FCL 220 similar to FIG. 18 but where the width of each limb 23 and 24 is less than the width of yokes 26 and 27. Accordingly, coil segments 30 and 31 and coils 51 and 52 lie substantially within the width of yokes 26 and 27. FIG. 23 shows a partially cutaway side view of FIG. 22.

Figure 24:
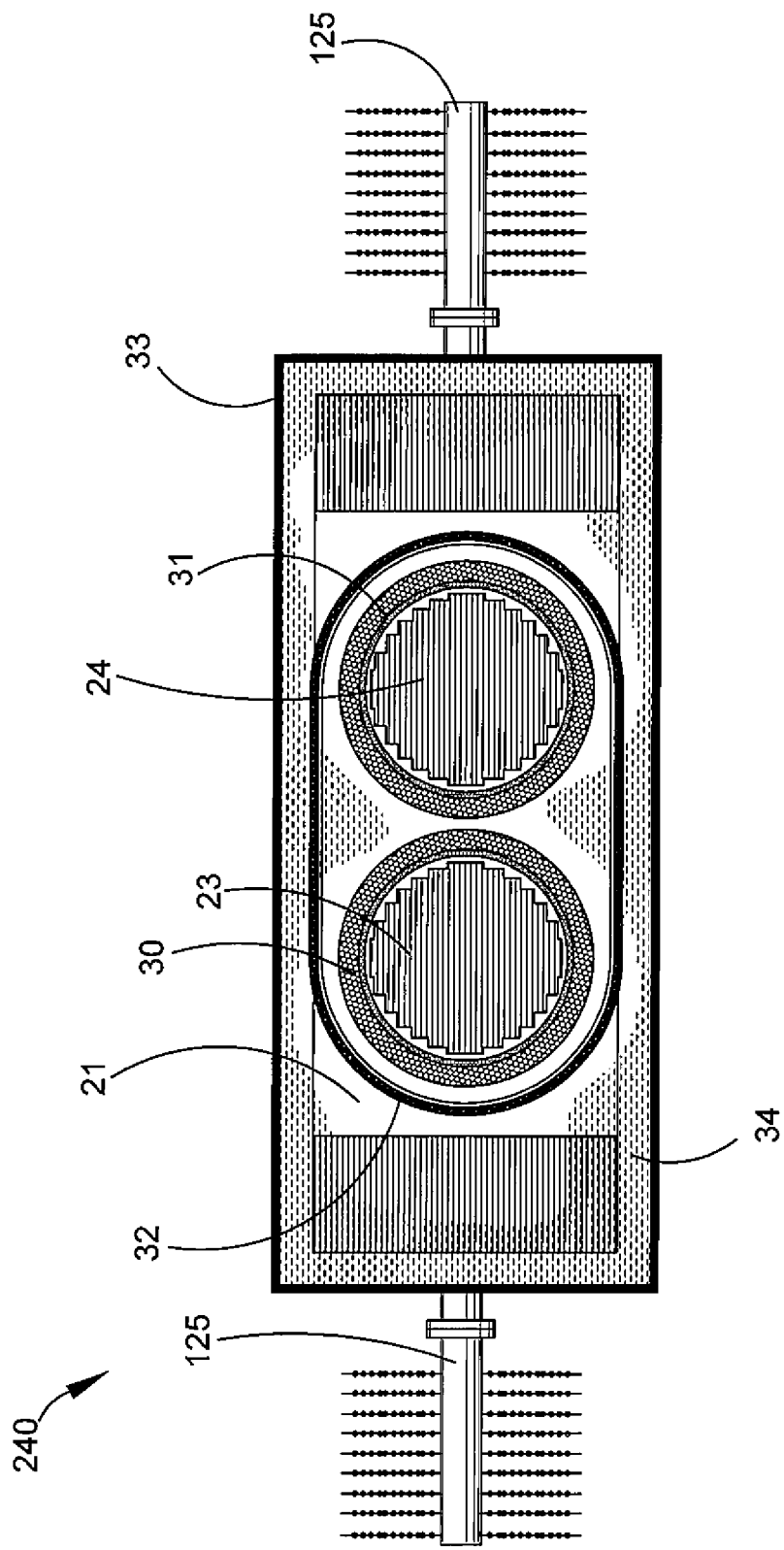
FIG. 24 is a cross-sectional top view of the single phase FCL according to another embodiment of the invention.

FIG. 24 shows a cross-sectional top view of single phase FCL 240 similar to FIG. 20 but where the width of each limb 23 and 24 is less than the width of the yokes, such that coil 32 and coil segments 30 and 31 lie substantially within the width of the yokes. As the yokes of FCL 240 are wider than the yokes of FCL 20, the length of the yokes of FCL 240 is less than the length of the yokes of FCL 20.

Figure 25:
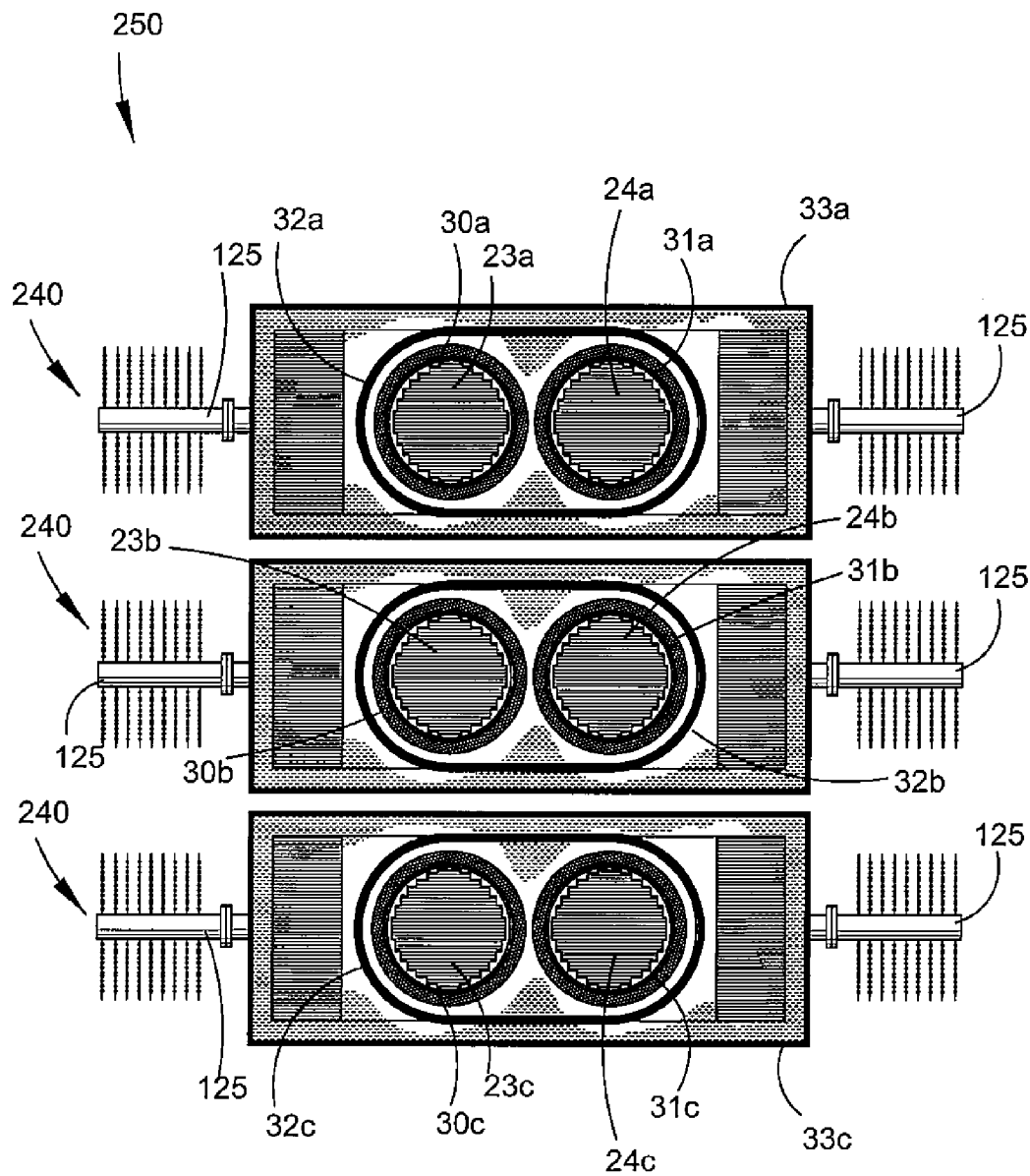
FIG. 25 is a cross-sectional top view of a three phase FCL utilising three like single phase FCLs of FIG. 24.

FIG. 25 show a three phase FCL 250 utilising three like single phase FCLs 240, one for each phase.

Figure 26:
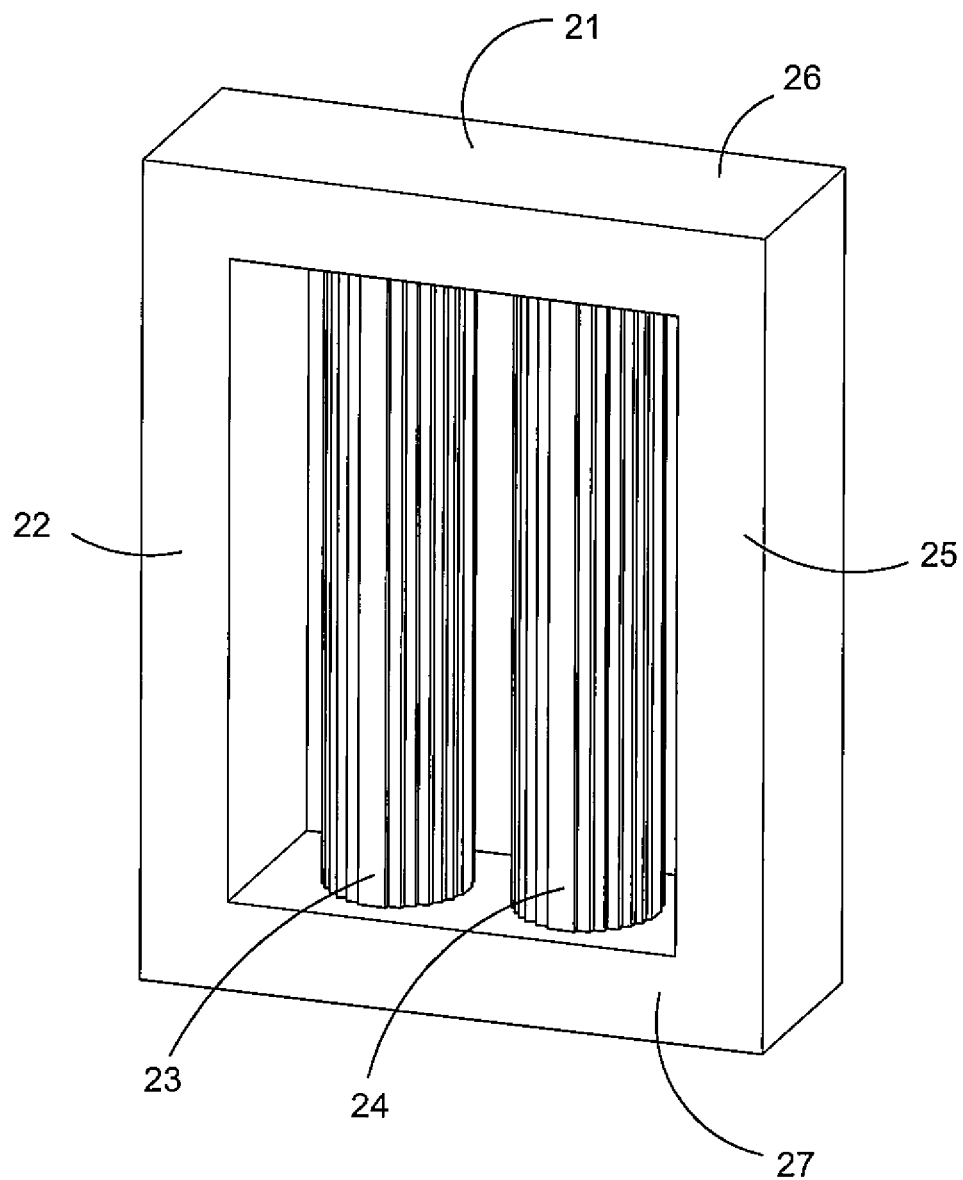
FIG. 26 a perspective view of the core shown in FIG. 24.

FIG. 26 shows core 21 of FCL 240 of FIG. 24. FIG. 26 best illustrates the width of limbs 23 and 24 being less than the width of yokes 26 and 27. Limbs 23 and 24 are generally cylindrical and have a substantially circular cross-sectional area. However, it will be appreciated that in other embodiments, the limbs are other than generally cylindrical and have other than a substantially circular cross-sectional area.

Figure 27:
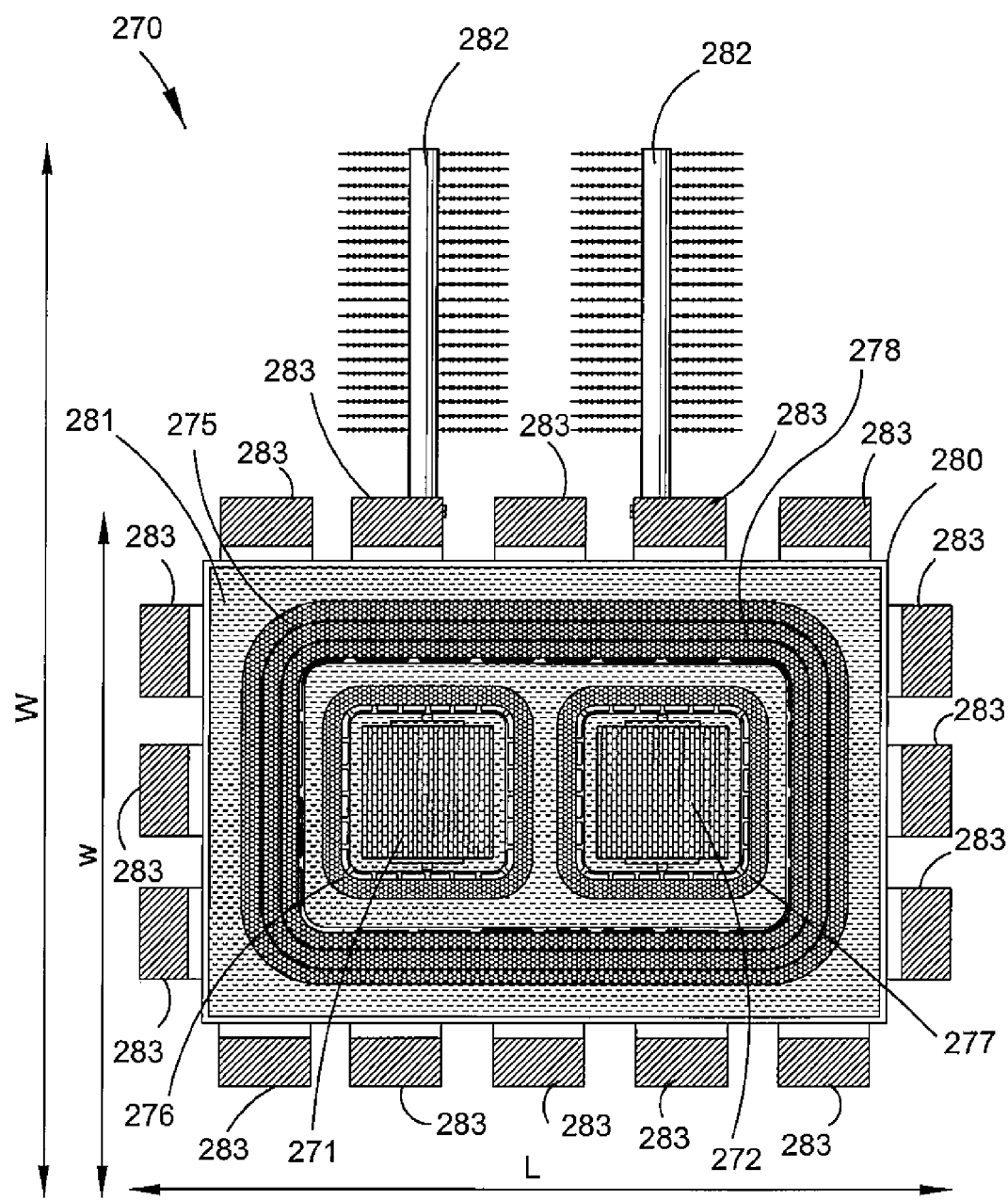
FIG. 27 is a cross-sectional top view of a single phase FCL according to another embodiment of the invention.
Figure 29:
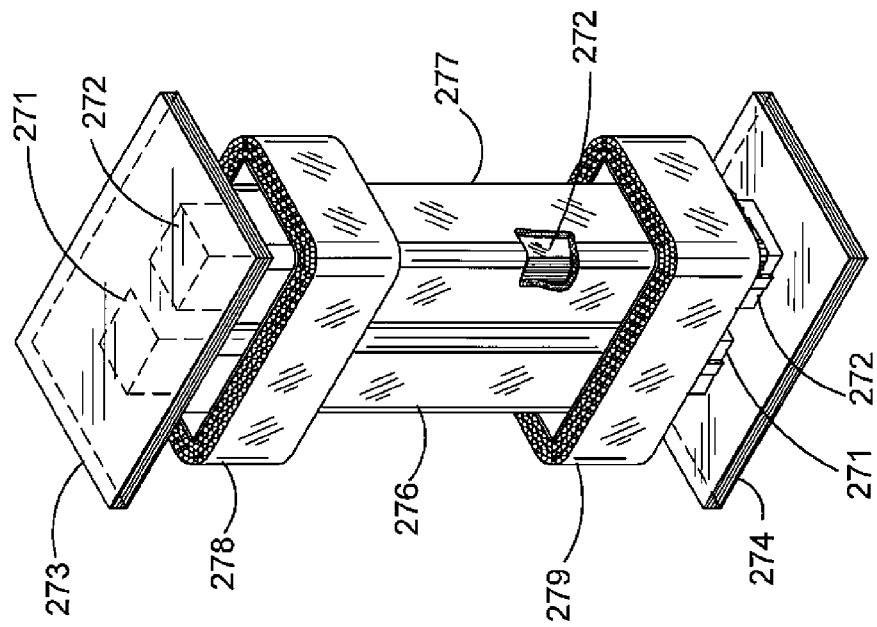
FIG. 29 is a partially cutaway perspective view showing the coil receiving limbs, yokes, AC coil and DC coils of the FCL of FIG. 27.

FIG. 27 shows a single phase FCL 270 according to another embodiment of the invention. As best shown in FIG. 29, FCL 270 includes two adjacent elongate and spaced apart generally rectangular laminated steel coil receiving limbs 271 and 272, which longitudinally co-extend between two substantially horizontal laminated steel yokes 273 and 274 that are vertically spaced apart. Limbs 271 and 272 each have a substantially square cross-sectional area. Referring again to FIG. 27, FCL 270 includes a copper-based insulated AC coil 275 which includes two series connected and spatially separated coil segments 276 and 277 disposed in opposite sense about respective limbs 271 and 272. A magnetic biasing system, in the form of two longitudinally spaced apart copper-based race track DC coils 278 and 279, are disposed about coil segments 276 and 277 and limbs 271 and 272. Yokes 273 and 274, limbs 271 and 272, coil segments 276 and 277 and coils 278 and 279 are all housed within a tank 280 containing oil 281. Tank 280 includes two cooling radiators 282 and sixteen like spaced apart longitudinally extending laminated steel return limbs 283 disposed on the outer walls of tank 280. Yokes 273 and 274 and limbs 283 define magnetic flux return paths for limbs 271 and 272. In this embodiment, the width of each limb 271 and 272 is significantly less than the width of yokes 273 and 274. Accordingly, coil segments 276 and 277, and coils 278 and 279 lie wholly within the width of yokes 273 and 274. However, it will be appreciated that in other embodiments, coil segments 276 and 277, and coils 278 and 279 lie other than wholly within the width of yokes 273 and 274.

Figure 28:
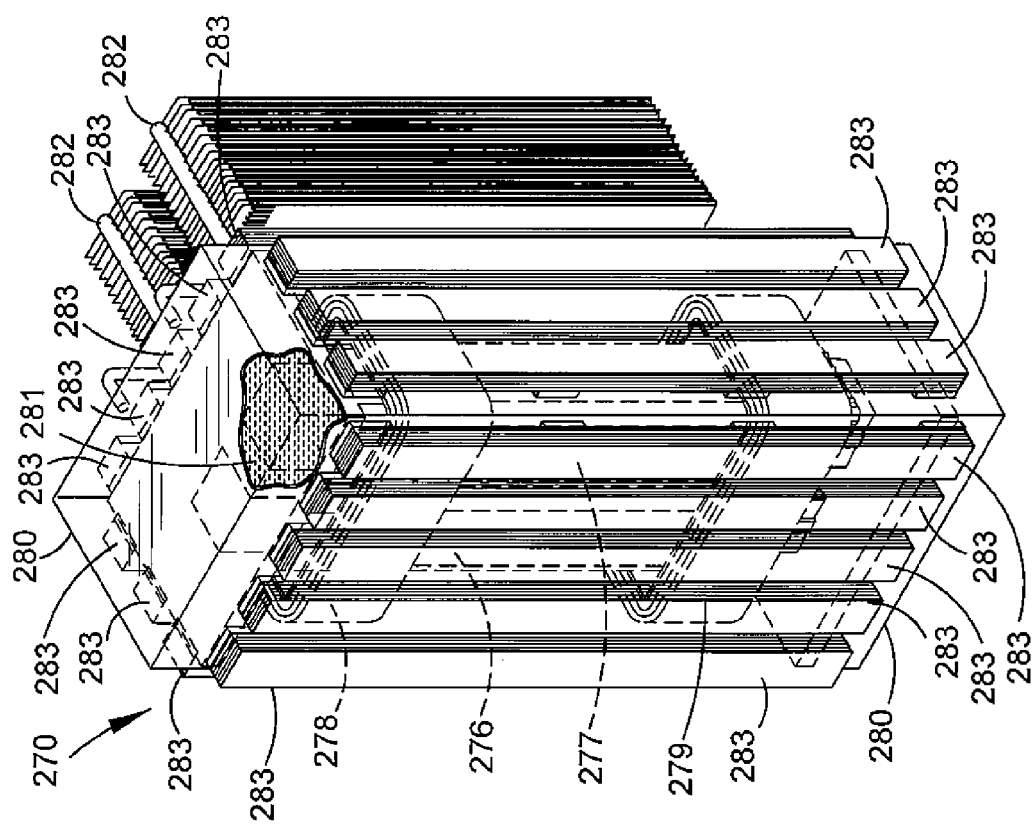
FIG. 28 is a partially cutaway perspective view of the single phase FCL of FIG. 27.

FIG. 28 is a partially cutaway perspective view of FCL 270 of FIG. 27. FIG. 29 shows the limbs 271 and 272, yokes 273 and 274, coil segments 276 and 277 and coils 278 and 279 of FCL 270.

Figure 30:
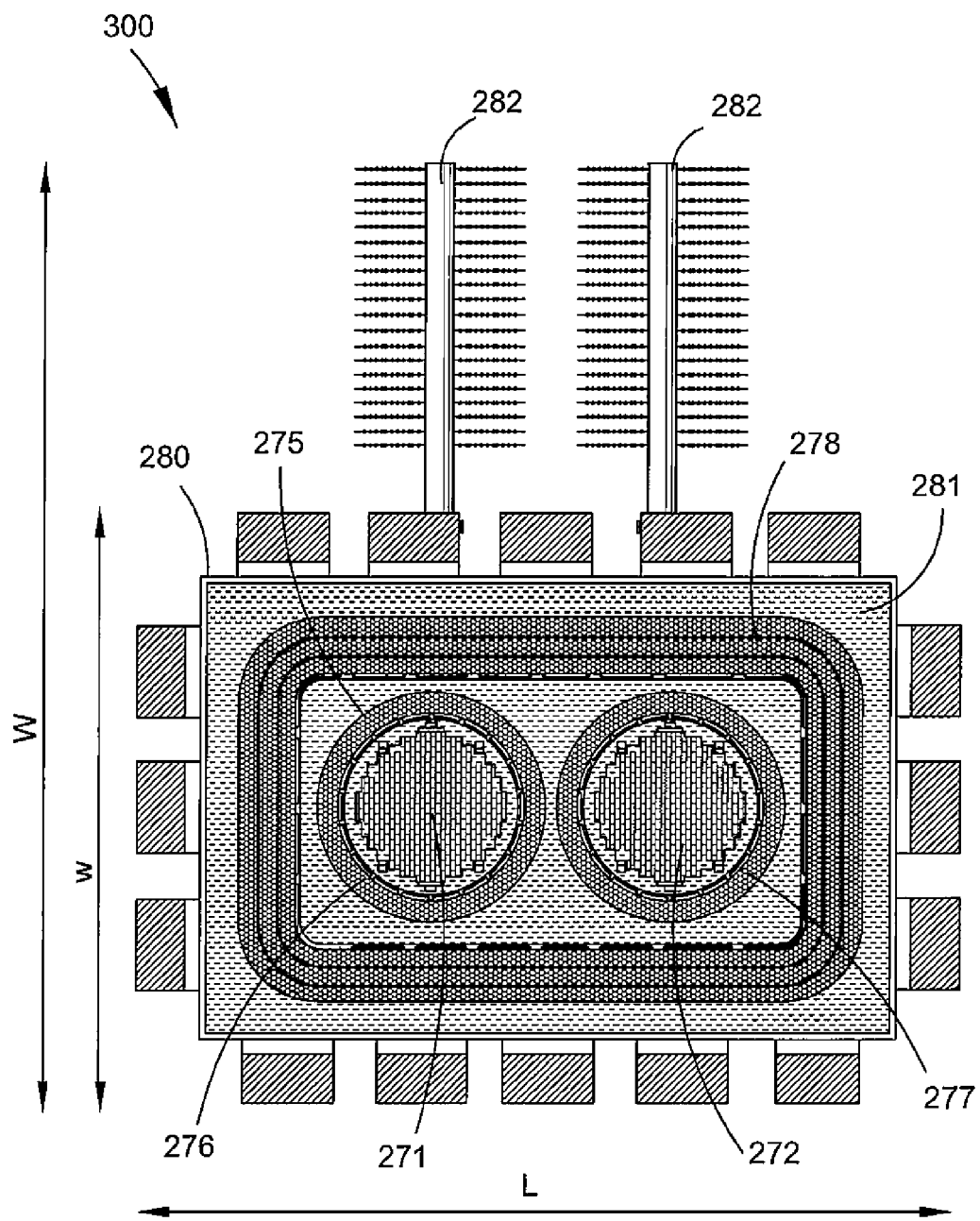
FIG. 30 is a cross-sectional top view of a single phase FCL similar to FIG. 27 but where each coil receiving limb has a substantially circular cross-sectional area.

FIG. 30 shows a single phase FCL 300 similar to FCL 270 of FIG. 27 but where each limb 271 and 272 has a substantially circular cross-sectional area. FIG. 31 is a partially cutaway perspective view of FCL 300 of FIG. 30. FIG. 32 shows the limbs 271 and 272, yokes 273 and 274, coil segments 276 and 277 and coils 278 and 279 of FCL 300.

Figure 33:
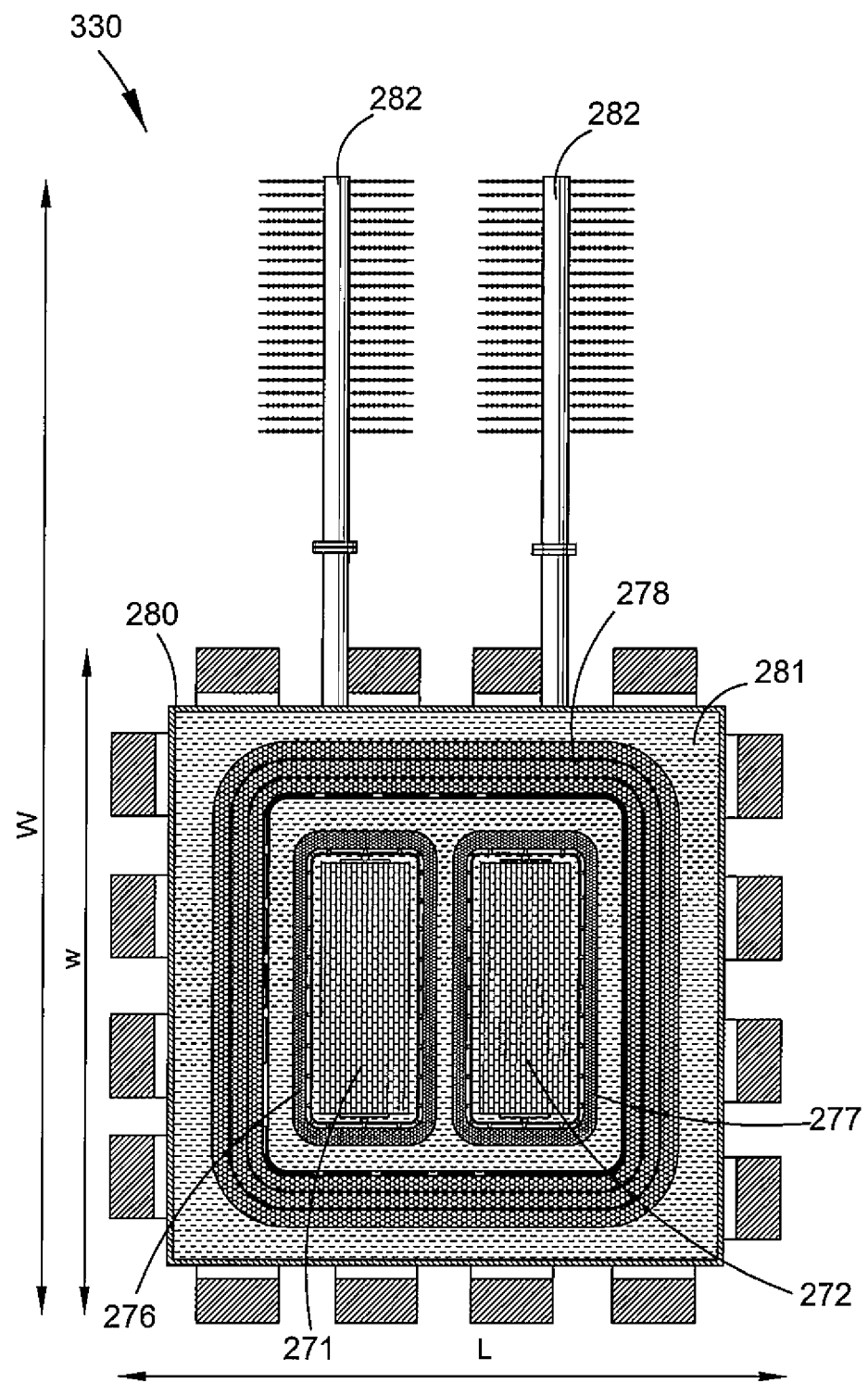
FIG. 33 is a cross-sectional top view of a single phase FCL similar to FIG. 27 but where each coil receiving limb has a substantially rectangular cross-sectional area.
Figure 35:
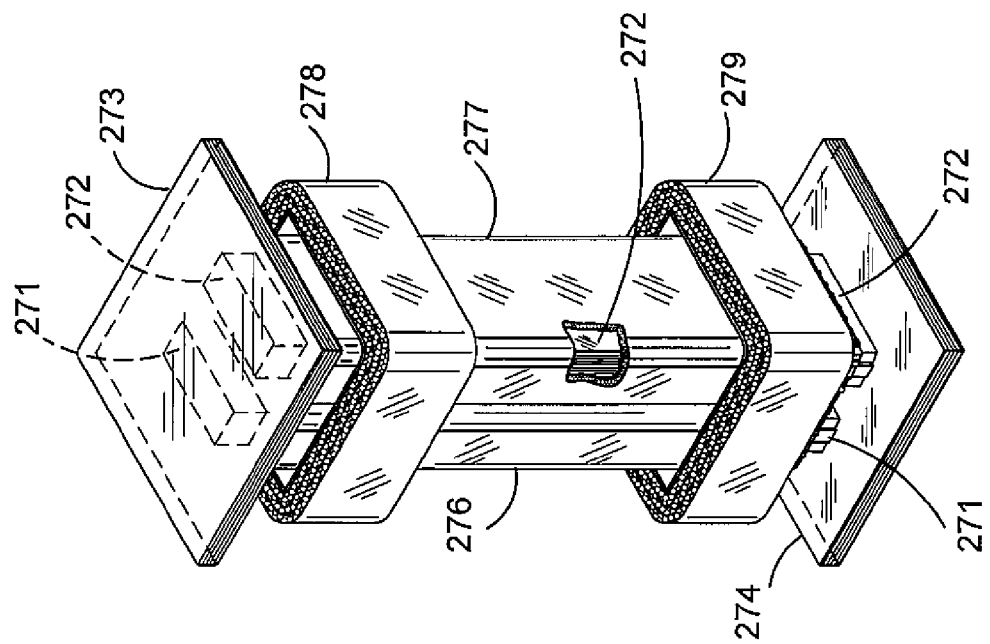
FIG. 35 is a partially cutaway perspective view showing the coil receiving limbs, yokes, AC coil and DC coils of the FCL of FIG. 33.
Figure 34:
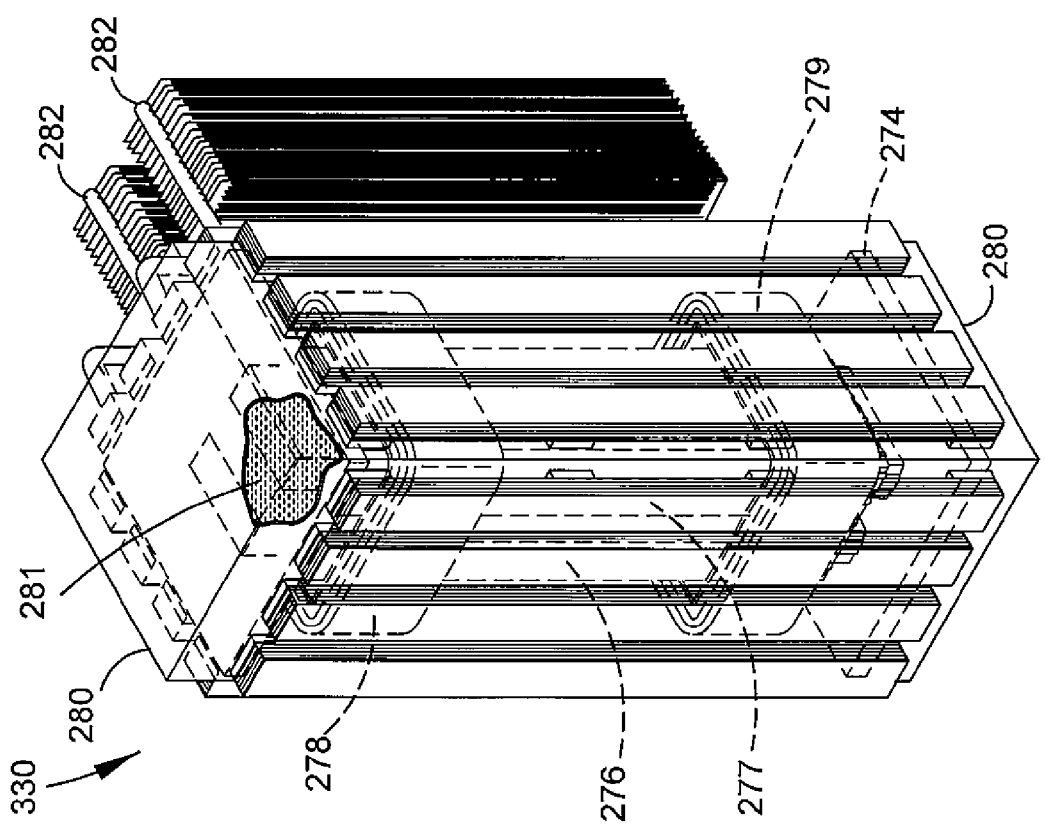
FIG. 34 is a partially cutaway perspective view of the single phase FCL of FIG. 33.

FIG. 33 shows a single phase FCL 330 similar to FCL 270 of FIG. 27 but where each limb 271 and 272 has a substantially rectangular cross-sectional area. FIG. 34 is a partially cutaway perspective view of FCL 330. FIG. 35 shows the limbs 271 and 272, yokes 273 and 274, coil segments 276 and 277 and coils 278 and 279 of FCL 330.

Figure 36:
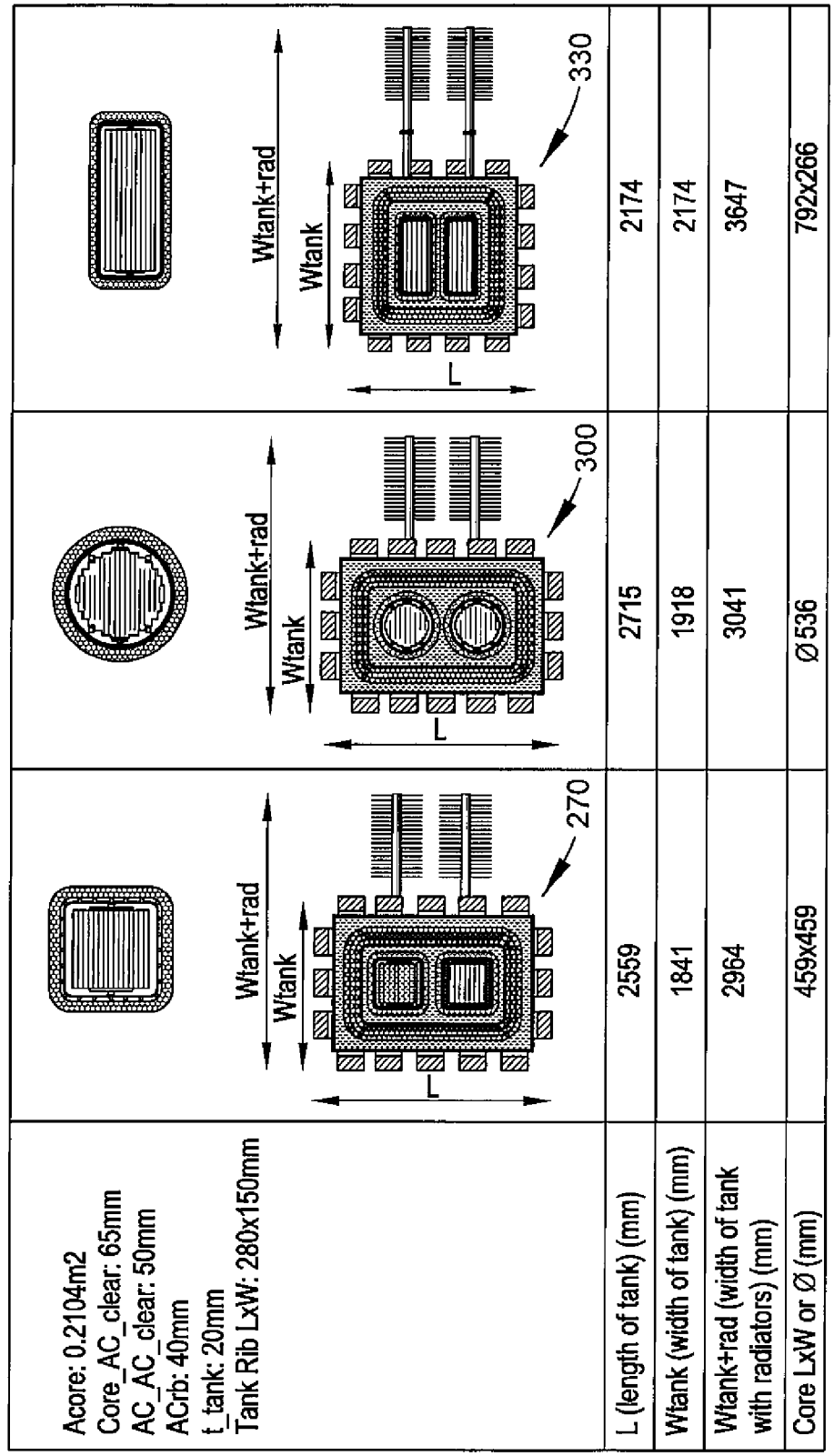
FIG. 36 is a table showing example dimensions for each of the FCLs shown in FIG. 27, FIG. 30 and FIG. 33.

FIG. 36 shows a table of dimensions for the single phase FCLs 270, 300 and 330, respectively. It will be appreciated that the dimensions shown in the table of FIG. 36 are examples only and that other dimensions are used in other embodiments of the invention. It will be appreciated by a skilled addressee, given the benefit of the teaching herein, that the embodiments of the invention are applicable to a wide range of different dimensions. In some embodiments, the critical design dimensions are total volume, in others footprint, in others height, in others one predetermined dimension. The invention is applicable to implementation in embodiments that fulfil a broad range of one or more of those criteria which makes the invention applicable to a wide variety of installation sites. For it will be appreciated that many installation sites are existing sub-stations where an FCL is to be retrofitted to prolong the useful life of the existing infrastructure. This often places very tight restrictions on one or more dimensions of the required FCL. The invention is able to offer considerable flexibility design of the FCL. For example, where a three phase FCL is required, it is possible to construct that with: three single phase cores housed in three separate tanks; three single phase cores housed in one separate tank; two half phase cores housed within a single tank; or two half phase cores housed within two separate tanks. It is also possible to have the cores orientated as shown in the drawings—that is, to be extending horizontally—or to have the cores extending otherwise. For example, in some embodiments, the cores extend vertically, while in further embodiments, the cores a laid flat, in that the limbs extend in a common horizontal plane.

Figure 37:
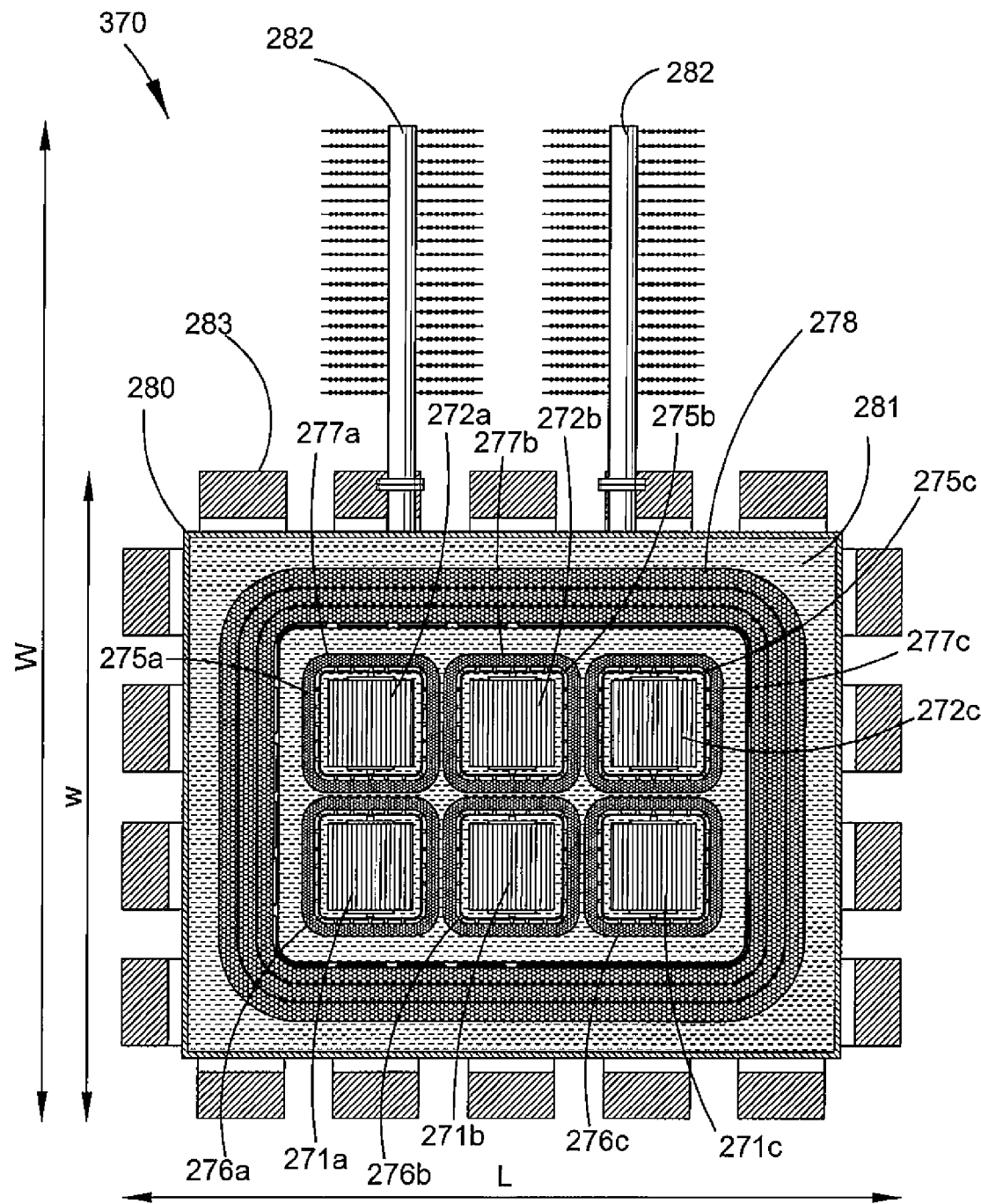
FIG. 37 is a cross-sectional top view of a three phase FCL according to another embodiment of the invention.

FIG. 37 shows a three phase FCL 370 according to another embodiment of the invention. FCL 370 has a similar arrangement to FCL 270 but includes six coil receiving limbs 271a, 272a, 271b, 272b, 271c and 272c which longitudinally co-extend between yokes 273 and 274. As with FCL 270, each limb 271a, 272a, 271b, 272b, 271c and 272c has a substantially square cross-sectional area. FCL 370 includes three copper-based insulated AC coil 275a, 275b and 275c, one for each phase, which each respectively include two coil segments 276a and 277a, 276b and 277b, and 276c and 277c, disposed in opposite sense about respective limbs 271a and 272a, 271b and 272b and 271c and 272c. Coils 278 and 279 are disposed about coil segments 276a, 277a, 276b, 277b, 276c and 277c, and limbs 271a, 272a, 271b, 272b, 271c and 272c. Yokes 273 and 274, limbs 271a, 272a, 271b, 272b, 271c and 272c, coil segments 276a, 277a, 276b, 277b, 276c and 277c, and coils 278 and 279 are all housed within tank 280 containing oil 281. Tank 280 includes two cooling radiators 282 and eighteen like spaced apart return limbs 283 disposed on the outer walls of tank 280.

FIG. 38 is a partially cutaway perspective view of FCL 370 of FIG. 37. FIG. 39 shows the limbs 271a, 272a, 271b, 272b, 271c and 272c, yokes 273 and 274, coil segments 276a, 277a, 276b, 277b, 276c and 277c, and coils 278 and 279 of FCL 370.

Figure 40:
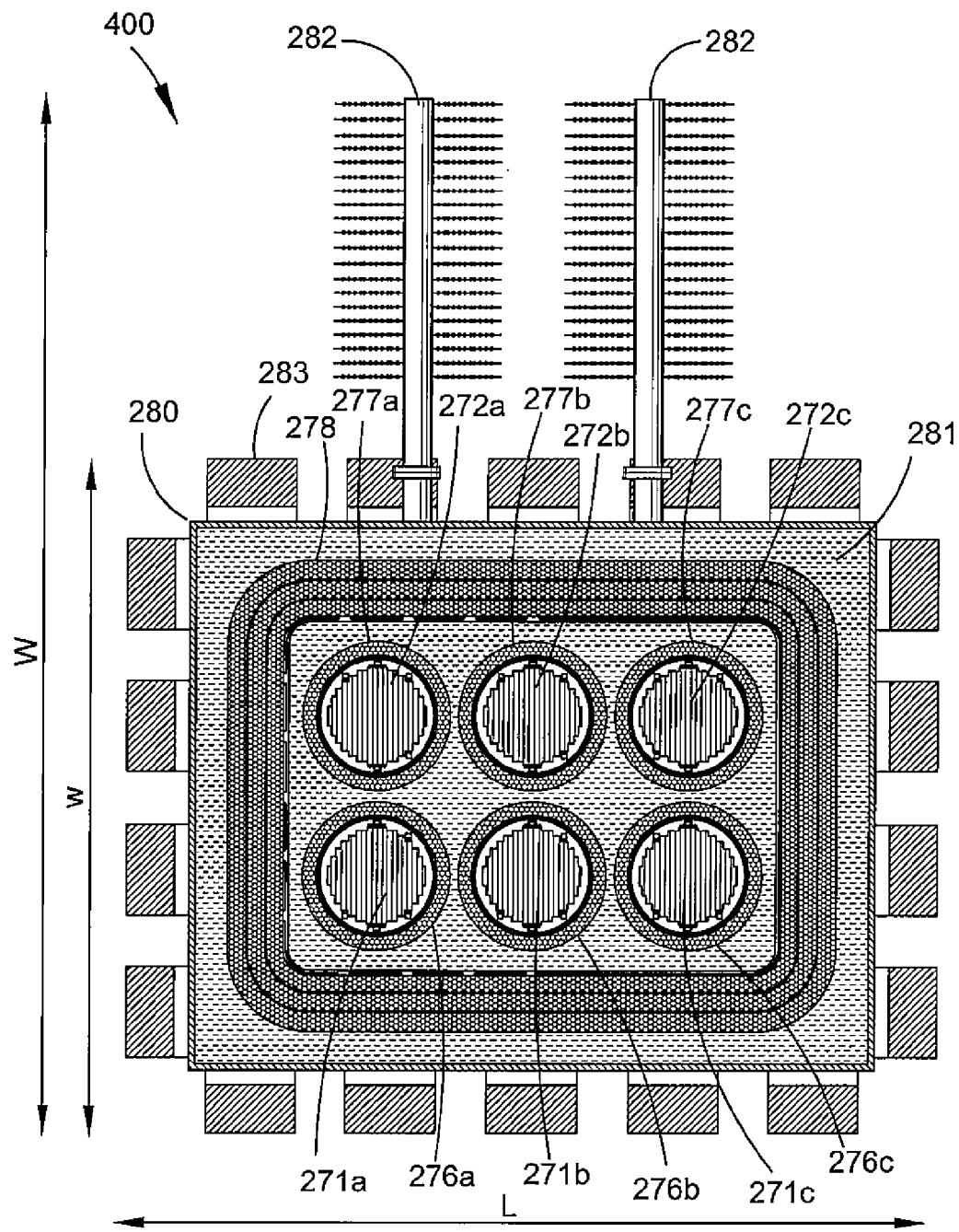
FIG. 40 is a cross-sectional top view of a three phase FCL similar to FIG. 37 but where each coil receiving limb has a substantially circular cross-sectional area.

FIG. 40 shows a three phase FCL 400 similar to FCL 370 of FIG. 37 but where each limb 271a, 272a, 271b, 272b, 271c and 272c has a substantially circular cross-sectional area. FIG. 41 is a partially cutaway perspective view of FCL 400 of FIG. 40. FIG. 42 shows the limbs 271a, 272a, 271b, 272b, 271c and 272c, yokes 273 and 274, coil segments 276a, 277a, 276b, 277b, 276c and 277c, and coils 278 and 279 of FCL 400 of FIG. 40.

Figure 43:
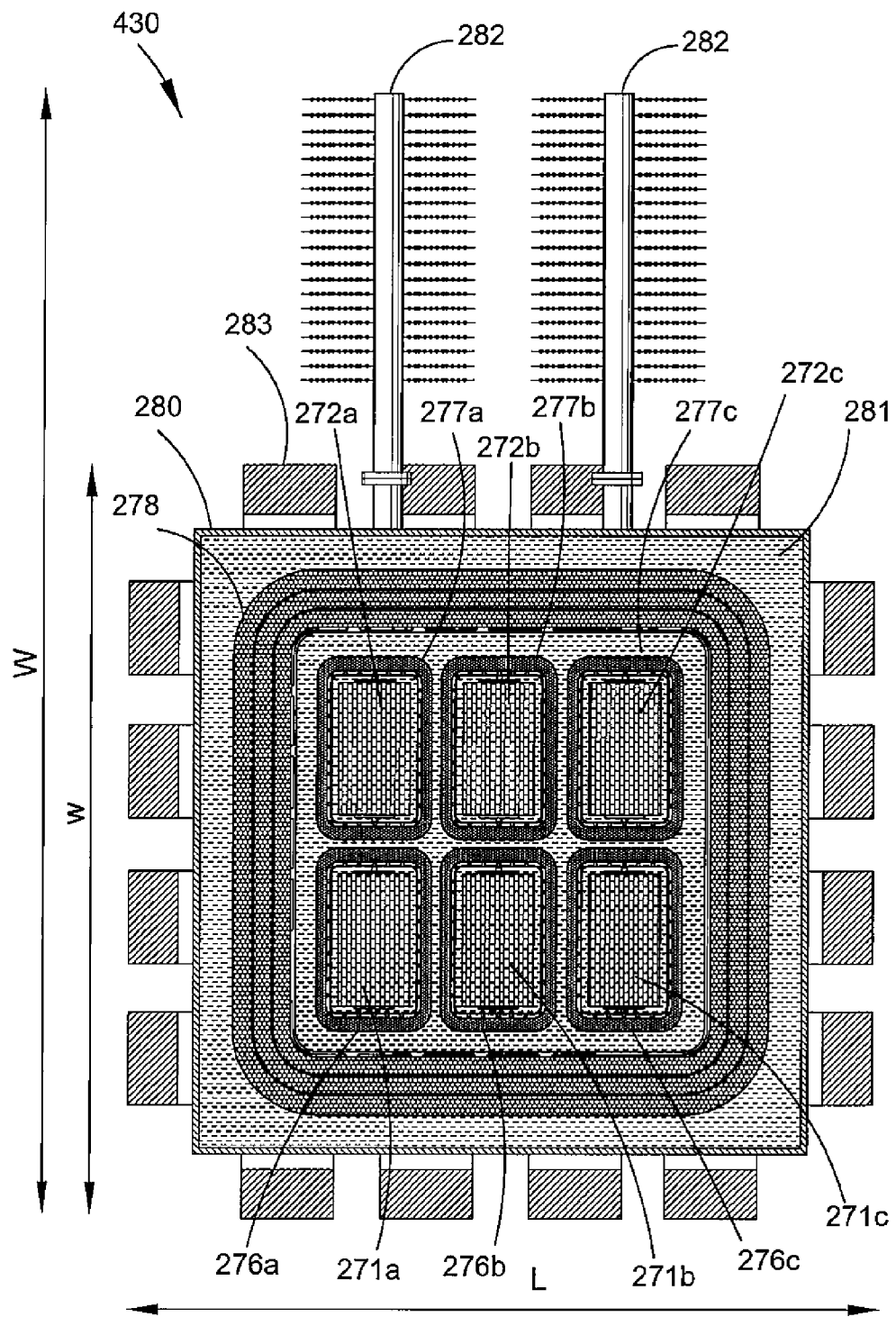
FIG. 43 is a cross-sectional top view of a three phase FCL similar to FIG. 37 but where each coil receiving limb has a substantially rectangular cross-sectional area.
Figure 45:
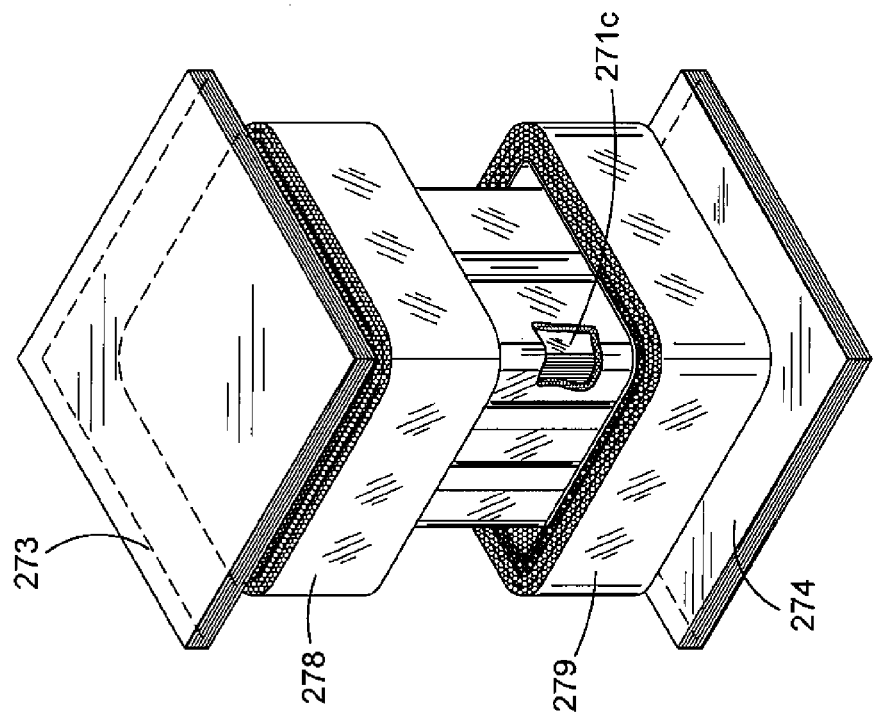
FIG. 45 is a partially cutaway perspective view showing the coil receiving limbs, yokes, AC coils and DC coils of the FCL of FIG. 43.
Figure 44:
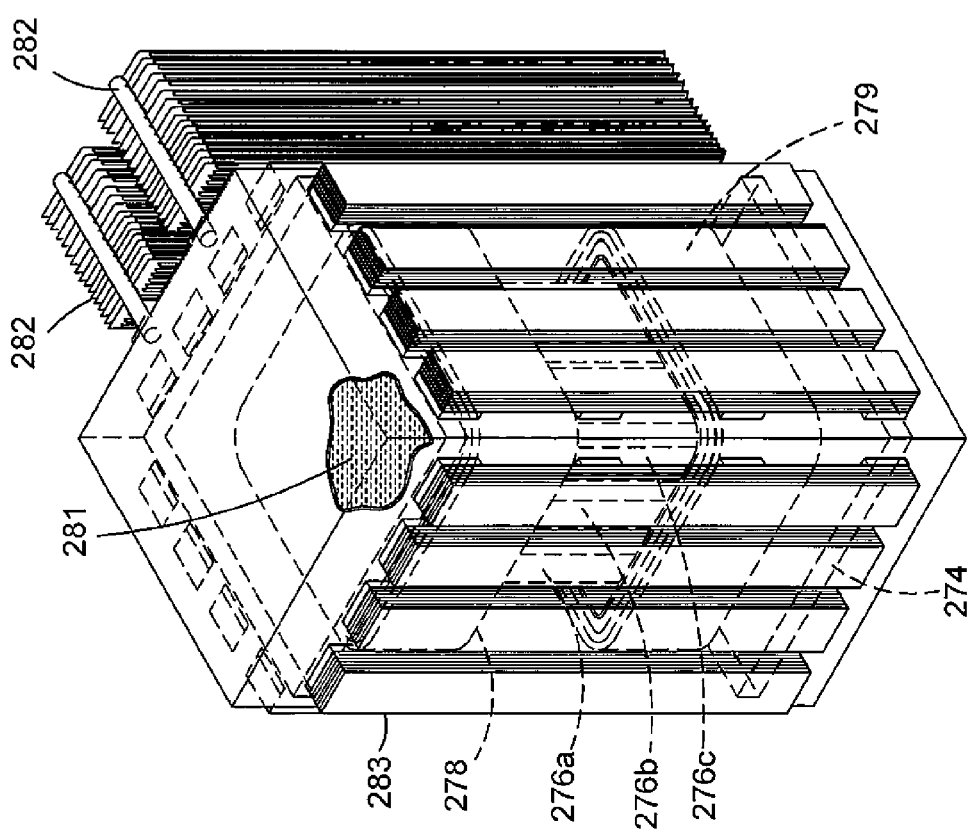
FIG. 44 is a partially cutaway perspective view of the three phase FCL of FIG. 43.

FIG. 43 shows a three phase FCL 430 similar to FCL 370 of FIG. 37 but where each limb 271a, 272a, 271b, 272b, 271c and 272c has a substantially rectangular cross-sectional area. FIG. 44 is a partially cutaway perspective view of FCL 430. FIG. 45 shows the limbs 271a, 272a, 271b, 272b, 271c and 272c, yokes 273 and 274, coil segments 276a, 277a, 276b, 277b, 276c and 277c, and coils 278 and 279 of FCL 430.

Figure 46:
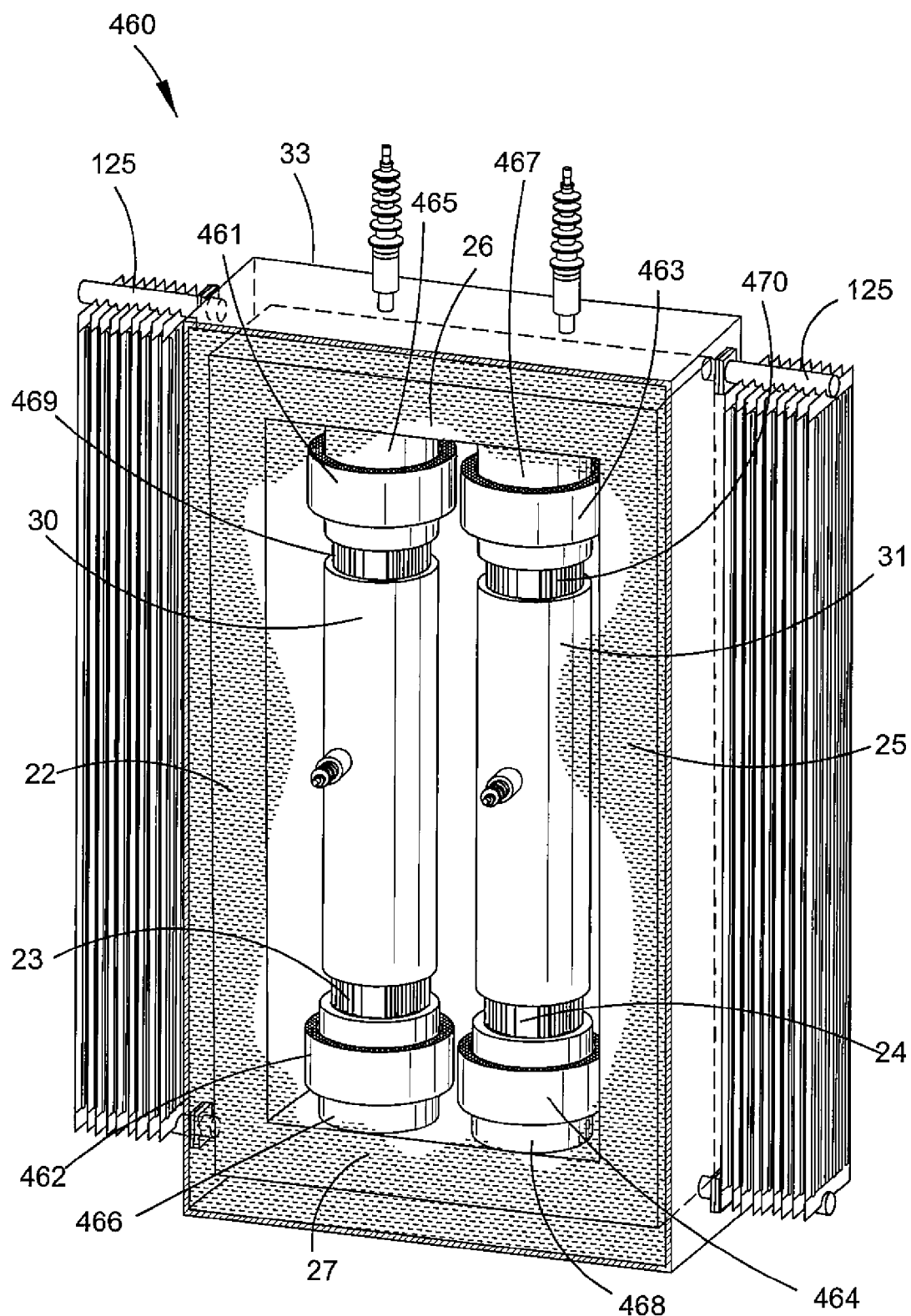
FIG. 46 is a partially cutaway perspective view of a single phase FCL according to another embodiment of the invention.

FIG. 46 shows a single phase FCL 460 according to an embodiment of the invention. FCL 460 is similar to FIG. 18 but where the magnetic biasing system includes four copper-based DC coils 461, 462, 463 and 464. Coils 461 and 462 are disposed adjacent to coil segment 30, and longitudinally spaced apart and disposed around and at opposite ends of limb 23. Similarly, coils 463 and 464 are disposed adjacent to coil segment 31, and longitudinally spaced apart and disposed around and at opposite ends of limb 24. Limb 23 includes two like end portions 465 and 466 about which coils 461 and 462 are respectively disposed. Limb 24 similarly includes two like end portions 467 and 468 about which coils 463 and 464 are respectively disposed. The diameter of each end portion 465, 466, 467 and 468 is greater than the diameter of mid-portions 469 and 470 of respective limbs 23 and 24.

Figure 47:
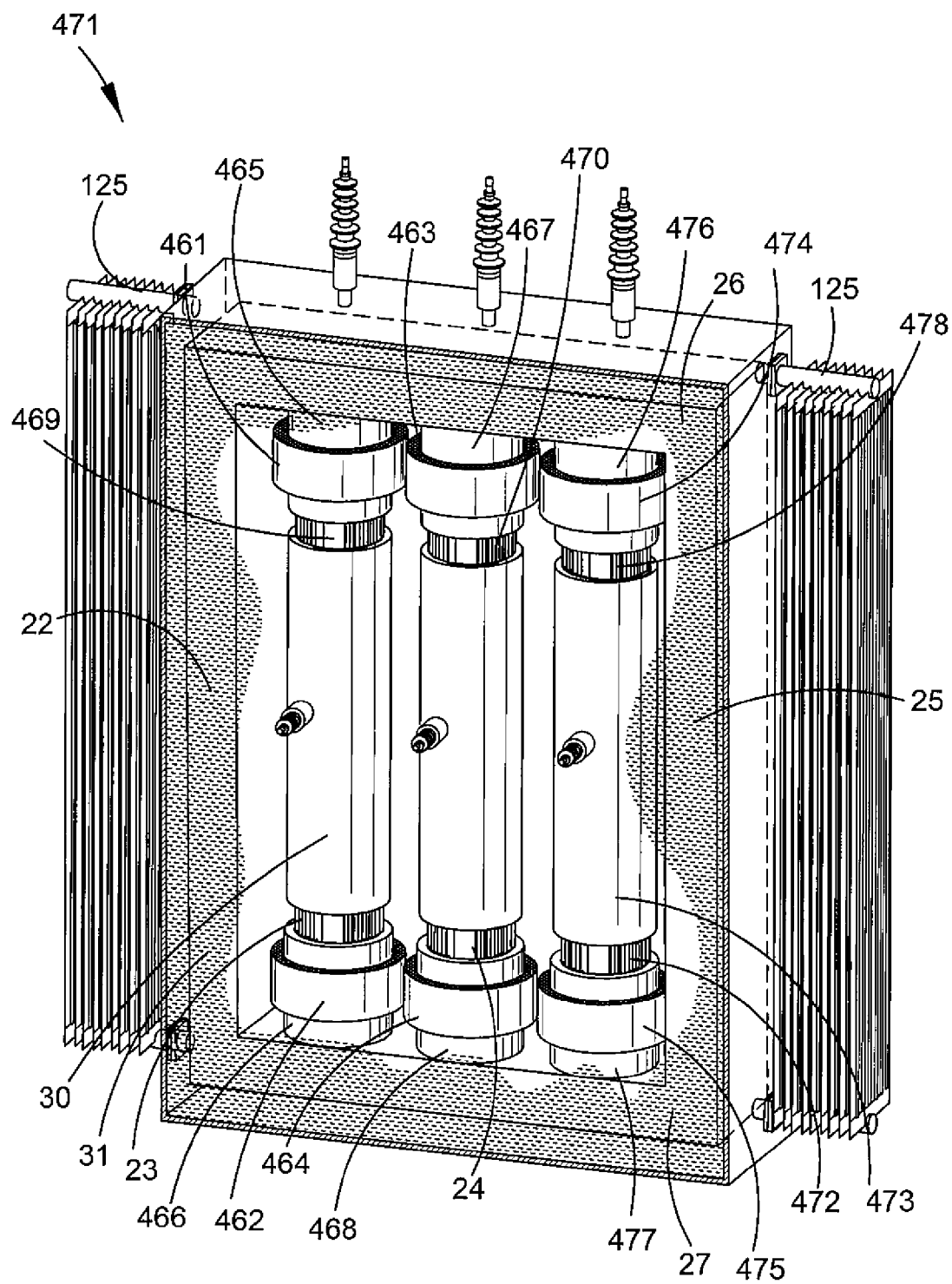
FIG. 47 is a partially cutaway perspective view of a FCL according to an embodiment of the invention.

FIG. 47 shows a FCL 471 similar to FCL 460 but including an additional generally cylindrical laminated steel coil receiving limb 472 disposed intermediate limbs 22 and 25. As with limbs 22, 23, 24 and 25, limb 472 longitudinally extends between yokes 26 and 27. FCL 471 also includes a coil segment 473 disposed about limb 472. Furthermore, FCL 471 includes two additional copper-based DC coils 474 and 475 are disposed adjacent to coil segment 473, and longitudinally spaced apart and disposed around and at opposite ends of limb 472. Limb 472 includes two like end portions 476 and 477 about which coils 474 and 475 are respectively disposed. The diameter of each end portion 476 and 477 is greater than the diameter of mid-portions 478 of limbs 472.

Figure 48:
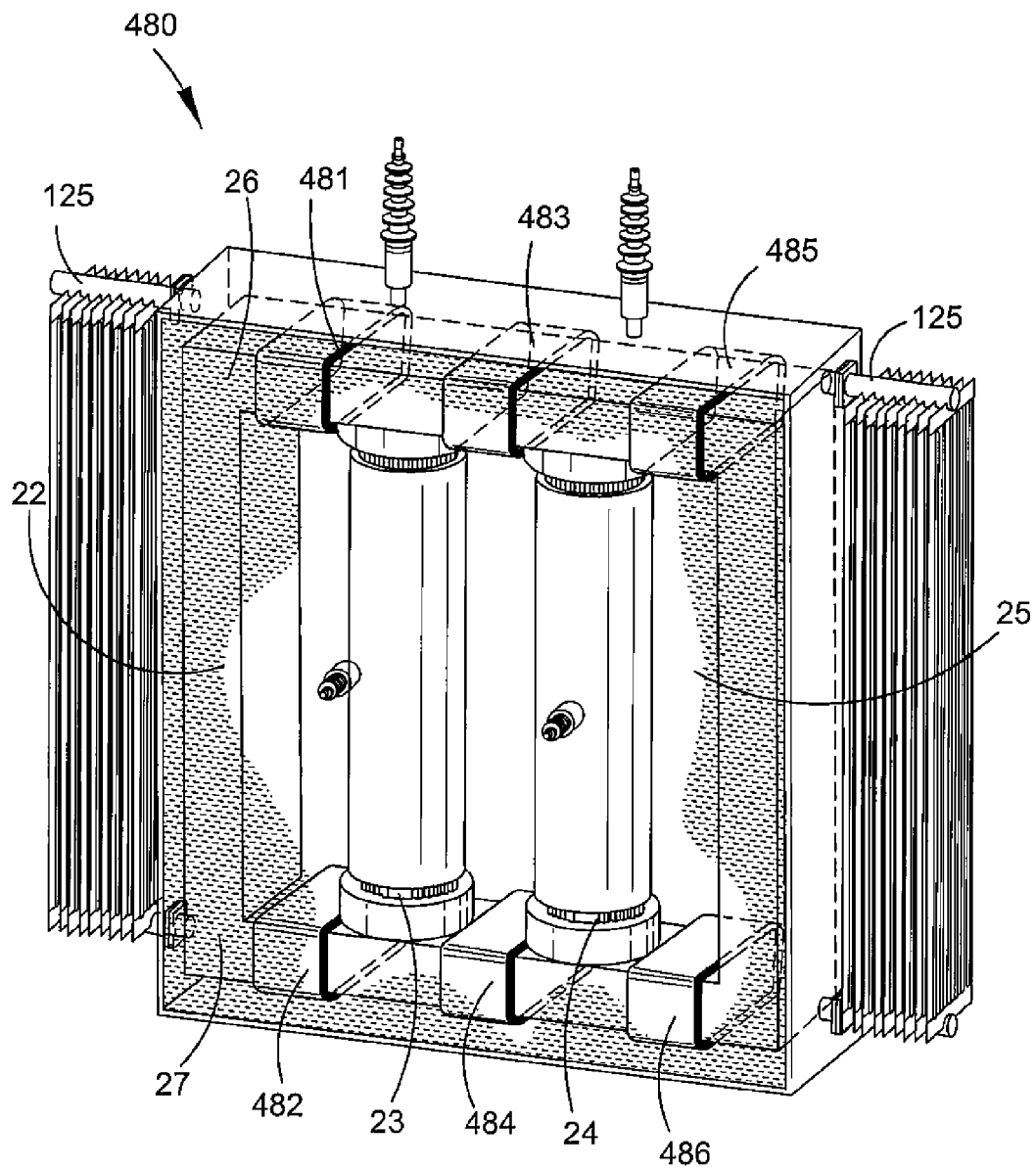
FIG. 48 is a partially cutaway perspective view of a single phase FCL according to another embodiment of the invention.

FIG. 48 shows a single phase FCL 480 similar to FCL 460 but where the magnetic biasing system includes six like copper-based DC coils 481, 482, 483, 484, 485 and 486. Coils 481, 483 and 485 are horizontally spaced apart and disposed about yoke 26 such that; coil 481 is intermediate limbs 22 and 23, coil 483 is intermediate limb 23 and 24, and coil 485 is intermediate limbs 24 and 25. Coils 482, 484 and 486 are similarly horizontally spaced apart and disposed about yoke 27 such that; coil 482 is intermediate limbs 22 and 23, coil 484 is intermediate limb 23 and 24, and coil 486 is intermediate limbs 24 and 25.

Figure 49:
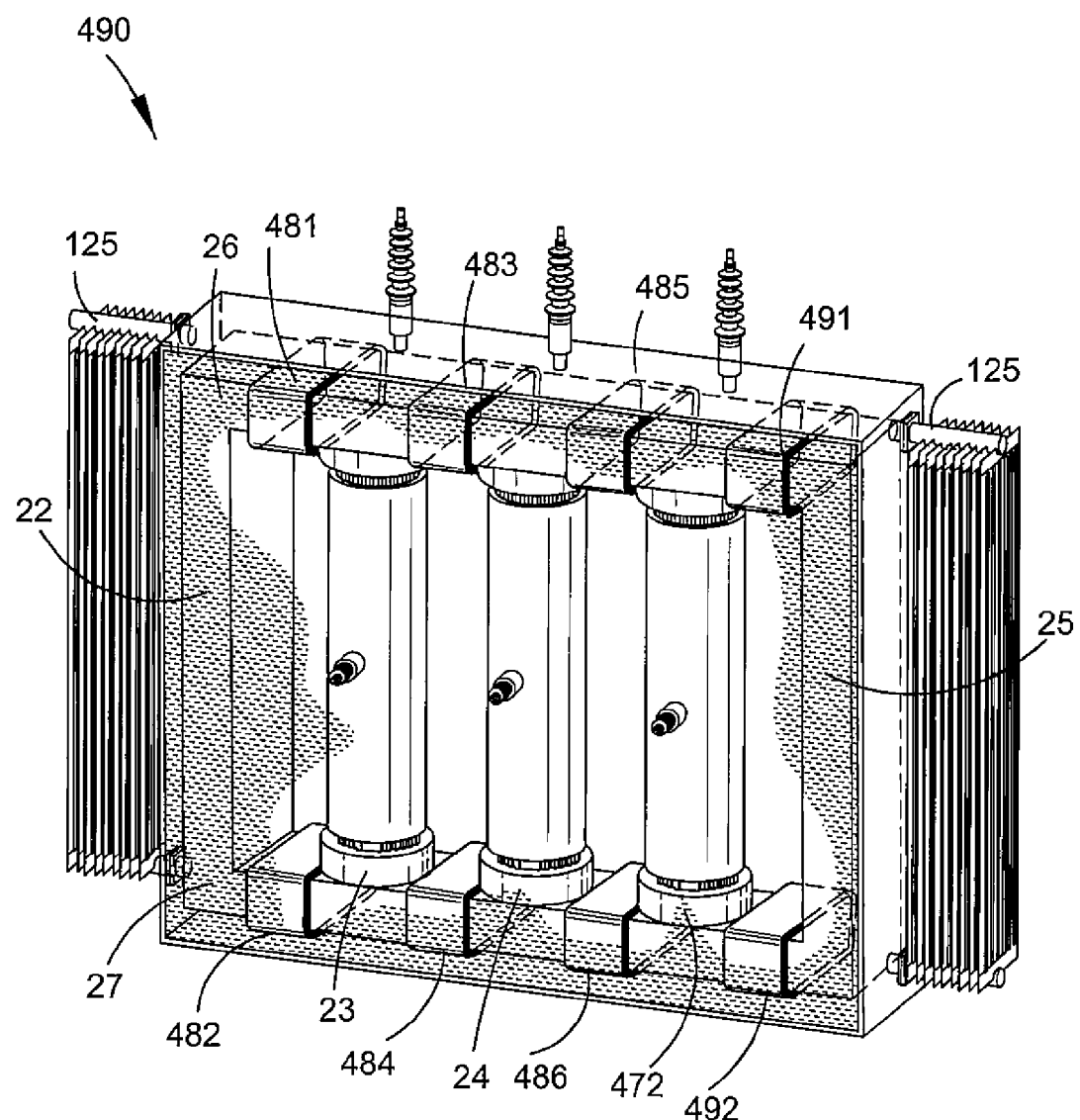
FIG. 49 is a partially cutaway perspective view of a FCL according to an embodiment of the invention.

FIG. 49 shows a FCL 490 similar to FCL 471 but where the magnetic biasing system is similar to that of FCL 480. FCL 490 includes two additional like copper-based DC coils 491 and 492 which disposed about yokes 26 and 27 respectively. In this embodiment, coils 481, 483, 485 and 491 are horizontally spaced apart and disposed about yoke 26 such that; coil 481 is intermediate limbs 22 and 23, coil 483 is intermediate limb 23 and 24, coil 485 is intermediate limbs 24 and 472, and coil 491 is intermediate limbs 472 and 25. Coils 482, 484, 486, and 492 are similarly horizontally spaced apart and disposed about yoke 27 such that; coil 482 is intermediate limbs 22 and 23, coil 484 is intermediate limb 23 and 24, and coil 486 is intermediate limbs 24 and 472, and coil 492 is intermediate limbs 472 and 25.

Figure 50:
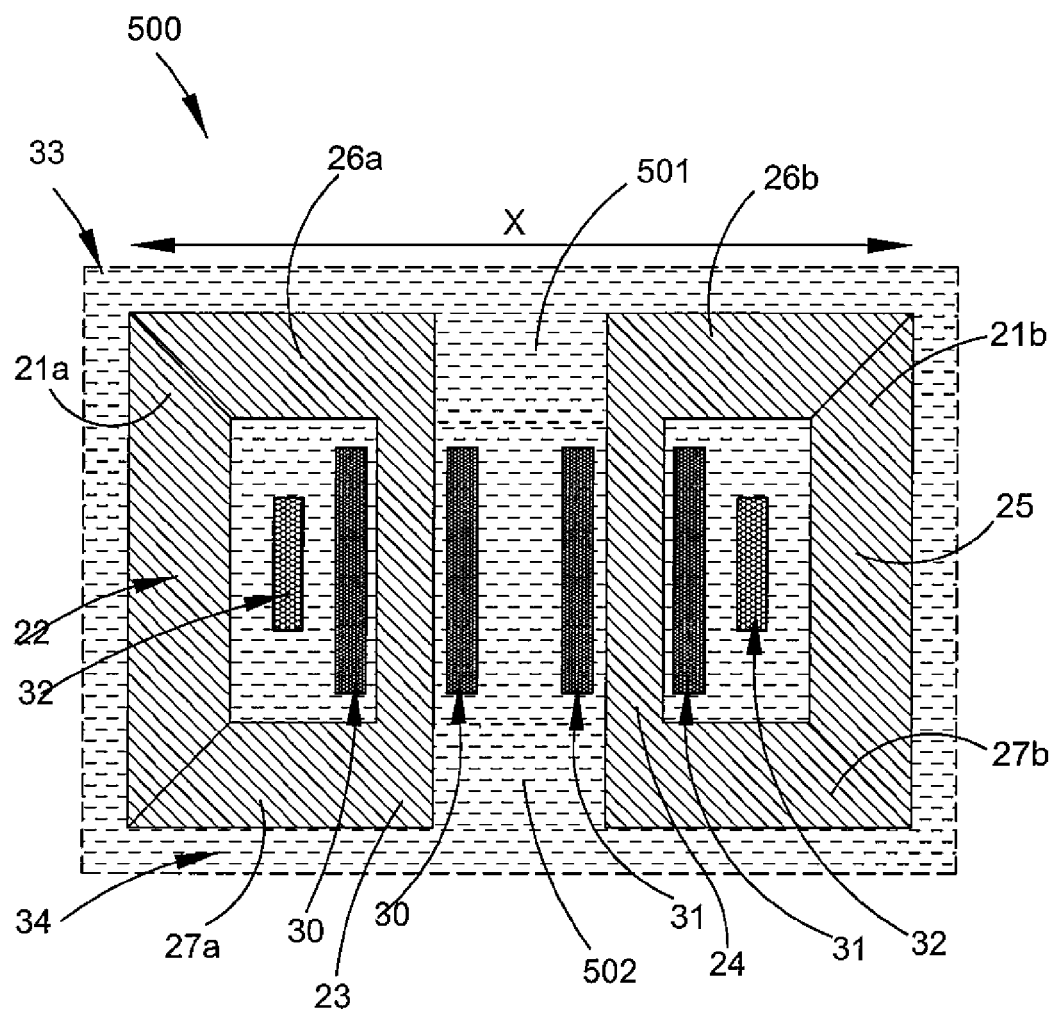
FIG. 50 is a cutaway side view of a single phase FCL according to an embodiment of the invention.
Figure 51:
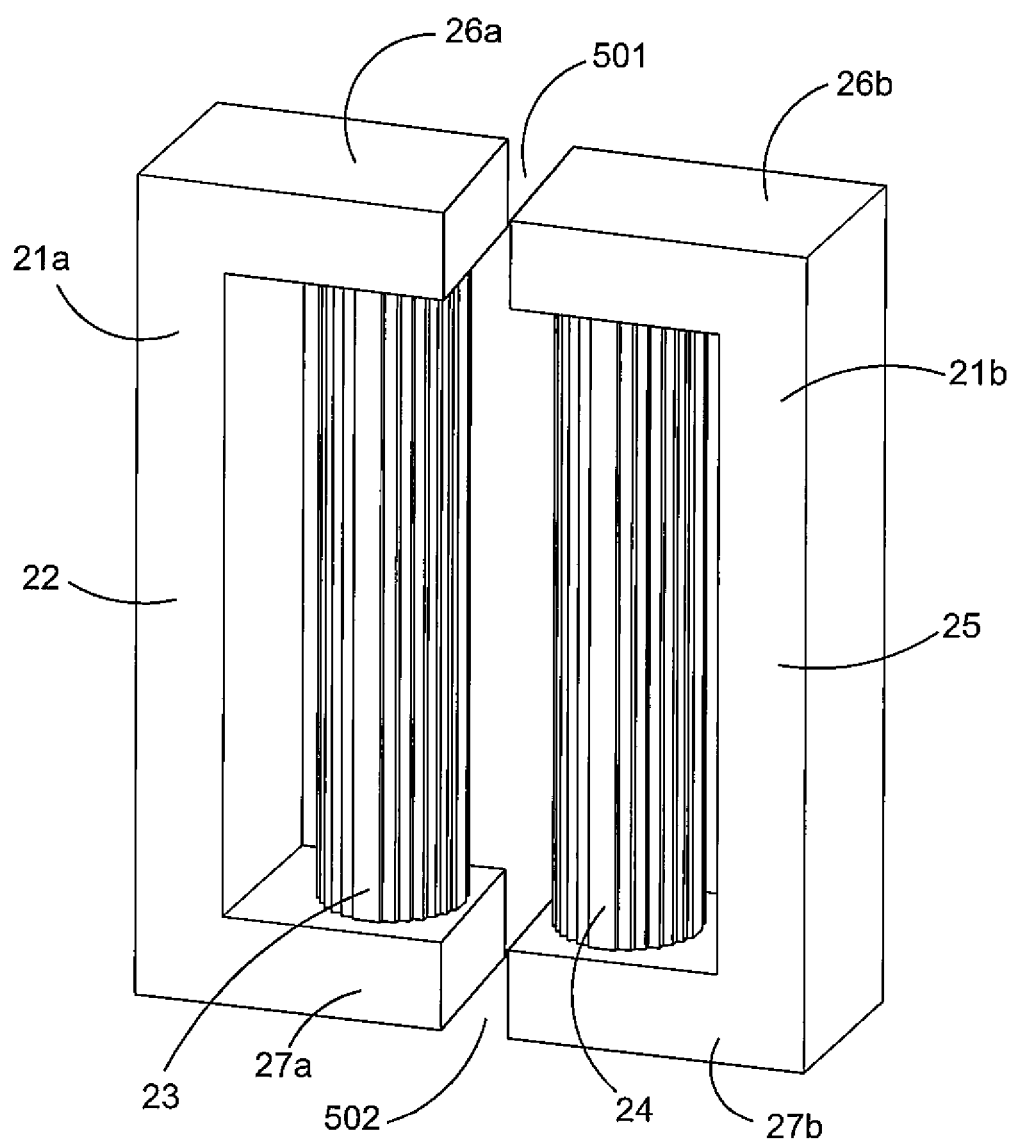
FIG. 51 is a perspective view of the core shown in FIG. 50.

FIG. 50 shows a single phase FCL 500 similar to FCL 20 of FIG. 2, but where core 21 includes two core segments 21a and 21b. Core segment 21a includes limbs 22 and 23 longitudinally extending between yokes 26a and 27a. Core segment 21b includes limbs 24 and 25 longitudinally extending between yokes 26b and 27b. Coil segments 30 and 31 remain disposed in opposite sense about respective limbs 23 and 24, and coil 32 remains disposed about both coil segments 30 and 31, and both limbs 23 and 24. Yoke 26a is spaced apart from yoke 26b by an air gap 501. Similarly, yoke 27a is spaced apart from yoke 27b by an air gap 502. FIG. 51 is a perspective view of core segments 21a and 21b of FCL 500 shown in FIG. 50.

Figure 52:
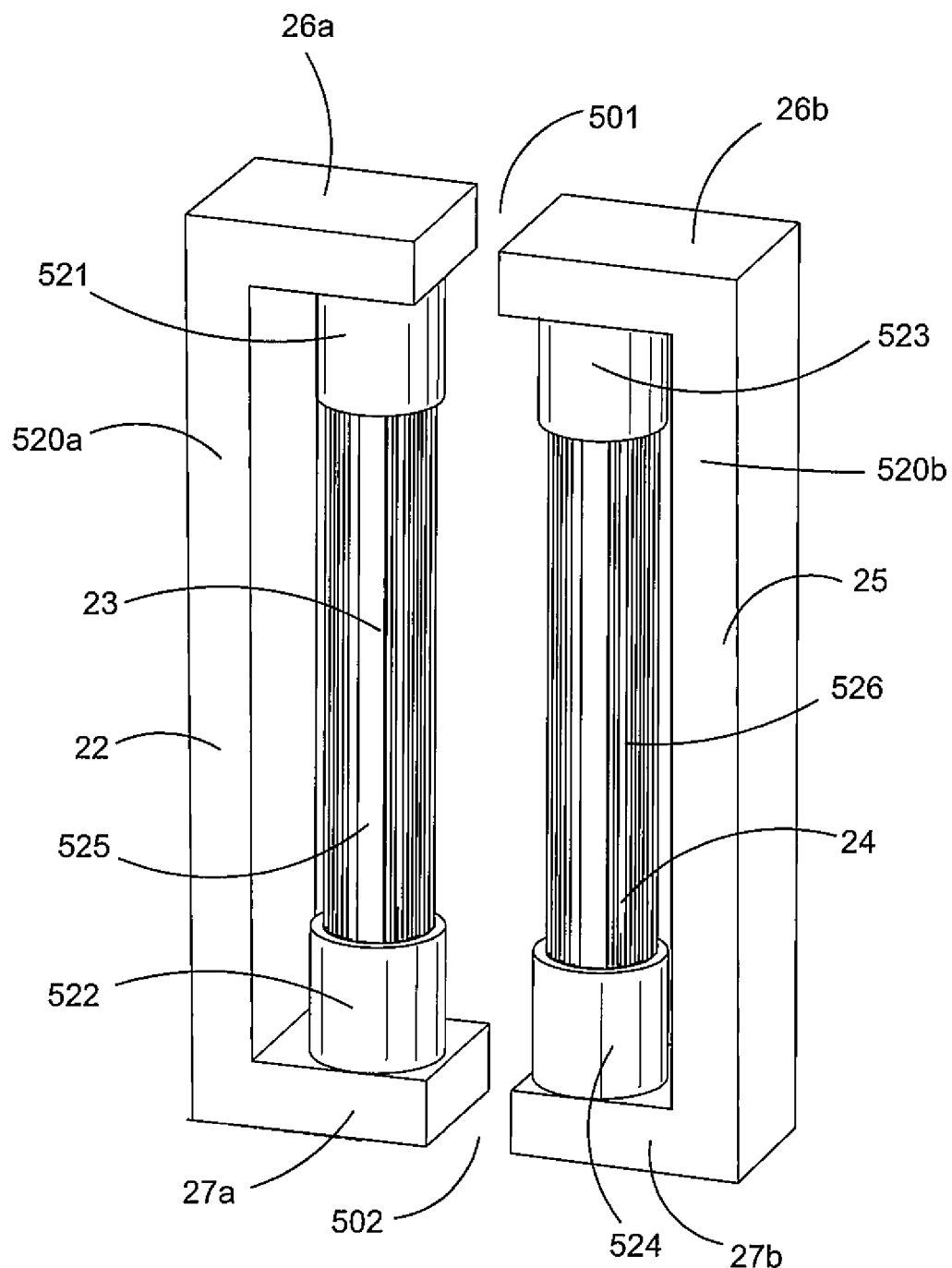
FIG. 52 is a perspective view of a core according to another embodiment of the invention.

FIG. 52 shows two core segments 520a and 520b similar to core segments 21a and 21b shown in FIG. 51 but where limb 23 includes two like end portions 521 and 522 located at opposite ends of limb 23, and limb 24 includes two like end portions 523 and 524 located at opposite ends of limb 24. The diameter of each end portion 521, 522, 523 and 524 is greater than the diameter of mid-portions 525 and 526 of respective limbs 23 and 24.

The term "footprint" as used herein, unless otherwise specified, should be understood as the underlying surface area required to accommodate a structure or device. The footprint available to accommodate an FCL is often a critical design parameter as it is common to retrofit an FCL in an existing electrical sub-station or other facility where the available surface area is limited due to the need to maintain safe physical separation of disparate pieces of equipment that are operating at high voltages. The footprint is often expressed in terms of available area on a surface. The specification can be in terms of an absolute maximum area or footprint on the surface, or an area or footprint having one or more of a maximum length and a maximum breadth on the surface. It will be appreciated that the term "footprint" can also be interpreted as meaning the area taken up by some object, or the space or area of a 2-dimensional surface enclosed within a boundary. That is, the shape of the footprint need not be regular and is, in some embodiments, defined by a complex or irregular shape.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

It is to be noticed that the term coupled, when used in the claims, should not be interpreted as being limited to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact or that two or more elements are not in direct contact with each other but yet still co-operate or interact with each other.

The major advantages of the embodiments of the invention are based upon:

Coils constructed from copper or other metal.
The absence of superconducting coils.
The close proximity of the AC and DC coils.
The low magnetic reluctance return path in the magnetic circuit that remains out of saturation.
The ability to make use of standard transformer manufacturing techniques.
Low cost of manufacture.
Low cost of materials.

Those skilled in the art will recognise that these are examples applied to specific designs that were manufactured and that detailed results for other designs with different construction details will differ. The main conclusions and pattern of results are to be considered.

Although the invention has been described with reference to specific examples it will be appreciated by those skilled in the art that it may be embodied in many other forms.

The invention claimed is:

1. A fault current limiter including:
an input terminal for electrically connecting to a power source that provides a load current;
an output terminal for electrically connecting with a load circuit that draws the load current;
a magnetically saturable core including at least one coil receiving limb disposed intermediate at least two return limbs, wherein the limbs longitudinally extend between at least two yokes, and wherein the at least two yokes and the at least two return limbs define at least a portion of one or more magnetic flux return paths for the at least one coil receiving limb;
at least one AC coil disposed about the at least one coil receiving limb for carrying the load current between the input terminal and the output terminal; and
a magnetic biasing system for magnetically biasing the core such that, in response to one or more characteristics of the load current, the at least one AC coil moves from a low impedance state to a high impedance state.

2. A fault current limiter according to claim 1, wherein the core includes two coil receiving limbs and the AC coil includes two coil segments, each coil segment being disposed about a respective coil receiving limb.

3. A fault current limiter according to claim 2, wherein the biasing system includes a DC coil disposed about the two coil receiving limbs.

4. A fault current limiter according to claim 3, wherein the DC coil is disposed about the AC coil and the two coil receiving limbs.

5. A fault current limiter according to claim 2, wherein the biasing system includes two DC coils each disposed about a respective coil receiving limb.

6. A fault current limiter according to claim 5, wherein the two DC coils are each disposed about a respective coil segment and a respective coil receiving limb.

7. A fault current limiter according to claim 1, wherein the biasing system is disposed about at least one of the two yokes.

8. A fault current limiter according to claim 1, wherein the core includes a plurality of spaced apart core segments.

9. A fault current limiter according to claim 8, wherein the core segments are like and each core segment includes at least one coil receiving limb and at least one return limb longitudinally extending between at least two yokes.

10. A fault current limiter according to claim 9, wherein the AC coil includes two coil segments and each coil segment is disposed about one coil receiving limb.

11. A fault current limiter according to claim 10, wherein the biasing system includes a DC coil disposed about the at least one coil receiving limb of each core segment.

12. A fault current limiter according to claim 11, wherein each core segment includes more than one coil receiving limb and the DC coil is disposed about the coil receiving limbs of each core segment.

13. A fault current limiter according to claim 10, wherein the biasing system includes a DC coil disposed about the coil receiving limbs of the core.

14. A fault current limiter according to claim 1, wherein the core, the AC coil and the biasing system are immersed in a dielectric medium.

15. A fault current limiter including:
an input terminal for electrically connecting to a power source that provides a load current;
an output terminal for electrically connecting with a load circuit that draws the load current;
a magnetically saturable core for defining a magnetic circuit having at least one coil receiving portion and at least one return portion;
at least one AC coil disposed about the at least one coil receiving portion for carrying the load current between the input terminal and the output terminal; and
at least one permanent magnet disposed in the return portion and which is adjacent to and spaced apart from the at least one coil receiving portion for magnetically biasing the core such that, in response to one or more characteristics of the load current, the at least one AC coil moves from a low impedance state to a high impedance state, wherein
the core includes a first limb and the coil receiving portion extends along at least part of the first limb;
the core includes a second limb that is parallel with and spaced apart from the first limb and two yokes between which the limbs extend, wherein the second limb and the yokes define at least part of the return portion; and
the permanent magnet is disposed in one or more of the yokes.

16. A fault current limiter including:
an input terminal for electrically connecting to a power source that provides a load current;
an output terminal for electrically connecting with a load circuit that draws the load current;
a magnetically saturable core for defining a magnetic circuit having at least one coil receiving portion and at least one return portion;
at least one AC coil disposed about the at least one coil receiving portion for carrying the load current between the input terminal and the output terminal; and
at least one permanent magnet disposed in the return portion and which is adjacent to and spaced apart from the at least one coil receiving portion for magnetically biasing the core such that, in response to one or more characteristics of the load current, the at least one AC coil moves from a low impedance state to a high impedance state, wherein the core includes a first limb and the coil receiving portion extends along at least part of the first limb; and
the permanent magnet is disposed in the first limb.

* * * * *